US012592951B2

(12) United States Patent
Kim et al.

(10) Patent No.: US 12,592,951 B2
(45) Date of Patent: Mar. 31, 2026

(54) SIGNAL PROCESSING DEVICE AND VEHICLE COMMUNICATION DEVICE COMPRISING SAME

(71) Applicant: LG ELECTRONICS INC., Seoul (KR)

(72) Inventors: Taekyoung Kim, Seoul (KR); Chaeguk Cho, Seoul (KR); Changhun Sung, Seoul (KR); Hansung Kim, Seoul (KR); Jooyoung Choi, Seoul (KR); Junsang Park, Seoul (KR); Youngjae Kim, Seoul (KR); Jaejin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 18/574,596

(22) PCT Filed: Jun. 30, 2022

(86) PCT No.: PCT/KR2022/009473
§ 371 (c)(1),
(2) Date: Dec. 27, 2023

(87) PCT Pub. No.: WO2023/277634
PCT Pub. Date: Jan. 5, 2023

(65) Prior Publication Data
US 2024/0291841 A1     Aug. 29, 2024

(30) Foreign Application Priority Data
Jul. 1, 2021     (KR) ........................ 10-2021-0086549

(51) Int. Cl.
*H04W 4/46* (2018.01)
*B60R 16/023* (2006.01)
(Continued)

(52) U.S. Cl.
CPC ........ *H04L 63/1425* (2013.01); *B60R 16/023* (2013.01); *G06F 9/45558* (2013.01);
(Continued)

(58) Field of Classification Search
None
See application file for complete search history.

(56) References Cited

U.S. PATENT DOCUMENTS 10,899,317 B1 * 1/2021 Moeller .................. B60R 25/30
11,165,851 B2 * 11/2021 Galula ................ H04L 63/1441
(Continued)

FOREIGN PATENT DOCUMENTS

CN      108712733 A * 10/2018 ............ H04W 4/024
DE  112019004293 T5 * 7/2021 ......... H04L 63/1441
(Continued)

OTHER PUBLICATIONS

PCT International Application No. PCT/KR2022/009473 International Search Report dated Oct. 21, 2022, 5 pages.
(Continued)

*Primary Examiner* — Christopher B Robinson
(74) *Attorney, Agent, or Firm* — LEE, HONG, DEGERMAN, KANG & WAIMEY

(57) ABSTRACT

The present disclosure relates to a signal processing device and a vehicle communication device comprising same. The signal processing device according to an embodiment of the present disclosure comprises: a first processor for receiving a first message including a sensor signal in a vehicle on the basis of a first communication scheme, and performing signal processing; a second processor for receiving a second message including a communication message received from the outside, on the basis of a second communication scheme, and performing signal processing of the received second message; and a first accelerator for accelerating processing
(Continued)

of a message of the first communication scheme, wherein the first processor and the first accelerator share performing of intrusion detection for the first message. Accordingly, intrusion detection for a received message can be efficiently performed.

20 Claims, 21 Drawing Sheets

(51) Int. Cl.

| | |
|---|---|
| G06F 9/455 | (2018.01) |
| G06F 9/54 | (2006.01) |
| H04L 9/40 | (2022.01) |
| H04L 12/66 | (2006.01) |
| H04L 41/08 | (2022.01) |
| H04L 41/084 | (2022.01) |
| H04L 41/5054 | (2022.01) |
| H04L 67/12 | (2022.01) |
| H04W 4/40 | (2018.01) |
| H04W 4/48 | (2018.01) |
| H04W 12/40 | (2021.01) |
| H04L 12/40 | (2006.01) |

(52) U.S. Cl.

CPC .............. *G06F 9/544* (2013.01); *G06F 9/546* (2013.01); *H04L 12/66* (2013.01); *H04L 41/08* (2013.01); *H04L 41/084* (2013.01); *H04L 41/5054* (2013.01); *H04L 67/12* (2013.01); *H04W 4/40* (2018.02); *H04W 4/48* (2018.02); *H04W 12/40* (2021.01); *G06F 2009/45595* (2013.01); *H04L 2012/40215* (2013.01); *H04L 2012/40273* (2013.01)

(56) References Cited

U.S. PATENT DOCUMENTS

| | | | |
|---|---|---|---|
| 11,816,057 | B2 | 11/2023 | Saxena et al. |
| 2005/0216770 | A1 | 9/2005 | Rowett et al. |
| 2009/0193057 | A1 | 7/2009 | Maes |
| 2013/0070773 | A1 | 3/2013 | Lee et al. |
| 2017/0099195 | A1 | 4/2017 | Raney |
| 2017/0371698 | A1 | 12/2017 | Paolino et al. |
| 2019/0155650 | A1 | 5/2019 | Teshler et al. |
| 2019/0199537 | A1 | 6/2019 | Seo et al. |
| 2019/0268420 | A1 | 8/2019 | Acharya et al. |
| 2020/0143053 | A1* | 5/2020 | Gutierrez .............. G06F 21/554 |
| 2020/0183732 | A1 | 6/2020 | Cornett et al. |
| 2020/0186560 | A1 | 6/2020 | Ben-Noon et al. |
| 2020/0274851 | A1* | 8/2020 | Qiao ................... H04L 63/0263 |
| 2020/0285779 | A1 | 9/2020 | Foltin et al. |
| 2021/0075800 | A1* | 3/2021 | Paraskevas ......... H04L 63/1441 |
| 2021/0152605 | A1 | 5/2021 | Mizrahi |
| 2022/0126864 | A1* | 4/2022 | Moustafa .......... B60W 60/0013 |
| 2022/0303305 | A1* | 9/2022 | Shin ................... H04L 63/1441 |

FOREIGN PATENT DOCUMENTS

| | | |
|---|---|---|
| EP | 1688836 | 8/2006 |
| EP | 3402172 | 11/2018 |
| EP | 3745271 | 12/2020 |
| JP | 2017-112590 | 6/2017 |
| KR | 10-2004-0041718 | 5/2004 |
| KR | 10-2009-0092370 | 9/2009 |
| KR | 10-2010-0111225 | 10/2010 |
| KR | 10-1159377 | 6/2012 |
| KR | 10-1206894 | 11/2012 |
| KR | 10-2013-0068631 | 6/2013 |
| KR | 10-1446525 | 10/2014 |
| KR | 10-1612825 | 4/2016 |
| KR | 10-2017-0099701 | 9/2017 |
| KR | 10-2020-0140542 | 12/2020 |
| KR | 10-2244569 | 4/2021 |
| WO | 2015-103376 | 7/2015 |

OTHER PUBLICATIONS

PCT International Application No. PCT/KR2022/009478, International Search Report dated Oct. 18, 2022, 3 pages.
PCT International Application No. PCT/KR2022/009466, International Search Report dated Oct. 19, 2022, 4 pages.
PCT International Application No. PCT/KR2022/009470, International Search Report dated Oct. 19, 2022, 3 pages.
PCT International Application No. PCT/KR2022/009473, International Search Report dated Oct. 21, 2022, 3 pages.
Sim et al., "Service-Oriented Gateway: Connecting Automotive Ethernet and Cloud for Efficient Development of Connected Car Services," 2020 IEEE-SA Ethernet & IP @ Automotive Technology Day, Sep. 2020, 23 pages.
Garcia-Sanchez et al., "Deploying intelligent e-Health services in a mobile gateway," ResearchGate, Mar. 2020,20 pages.
M.P. De Vos, "Integration of wireless sensor networks with a service-oriented architecture," Mathematics and Computer Science, Eindhoven, Aug. 2009, 105 pages.
European Patent Office Application Serial No. 22833685.5, Search Report dated Sep. 24, 2024, 9 pages.
Kiran K N et al., "Day One: Contrail DPDK vRouter," XP093090925, Jan. 2021, 196 pages.
European Patent Office Application Serial No. 22833684.8, Search Report dated May 14, 2025, 9 pages.
European Patent Office Application Serial No. 22833687.1, Search Report dated Jun. 11, 2025, 9 pages.
European Patent Office Application Serial No. 22833690.5, Search Report dated Jun. 11, 2025, 10 pages.
United States Patent and Trademark Office U.S. Appl. No. 18/575,613, Office Action dated Jun. 4, 2025, 18 pages.
United States Patent and Trademark Office U.S. Appl. No. 18/576,052, Office Action dated Jul. 25, 2025, 26 pages.
Banks et al., "MQTT Version 5.0 OASIS Standard Mar. 7, 2019 Specification URIs," XP055902412, Mar. 2019, 6 137 pages.
Chisnall, "The Definitive Guide to the Xen Hypervisor," XP055728173, Jan. 2008, 307 pages.
U.S. Appl. No. 18/576,052, Office Action dated Jan. 30, 2026, 22 pages.

* cited by examiner

Cluster Message

SoF | ID (50C) | | | Data len. (8byte) | Payload (Set of signals) | CRC | EoF

8bytes

| 0 | 1 | . | . | . | . | 1 | 1 |

Low fuel warning signal

FIG. 13B

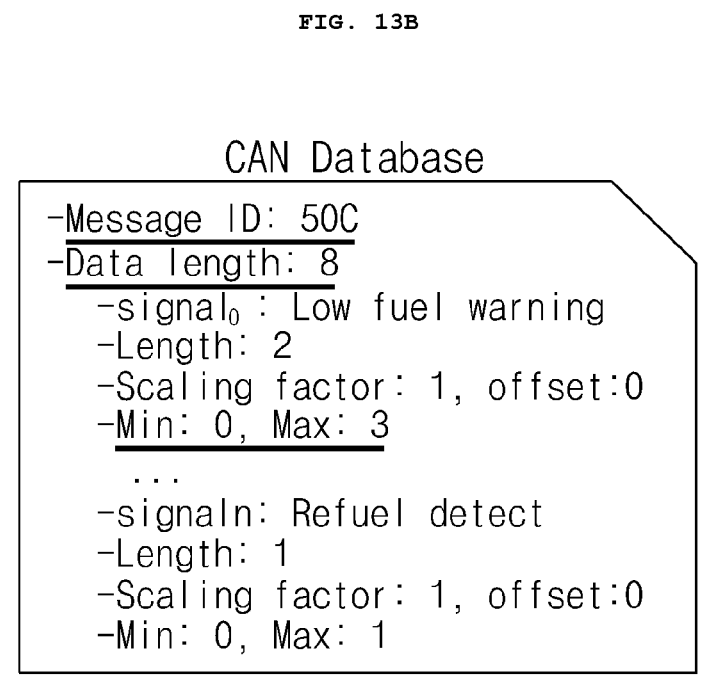

CAN Database

-Message ID: 50C
-Data length: 8
  -signal$_0$ : Low fuel warning
  -Length: 2
  -Scaling factor: 1, offset:0
  -Min: 0, Max: 3

. . .
  -signaln: Refuel detect
  -Length: 1
  -Scaling factor: 1, offset:0
  -Min: 0, Max: 1

CAN Database

-Message ID: 50C
-Message Cycle Time: 100ms

FIG. 15

| Detector | Feature |
|----------|---------|
| Format | Location |
| | Formality |
| | Range |
| Timing | Period |
| Semantic | Plausibility |

SIGNAL PROCESSING DEVICE AND VEHICLE COMMUNICATION DEVICE COMPRISING SAME

CROSS-REFERENCE TO RELATED APPLICATION(S)

This application is the National Stage filing under 35 U.S.C. 371 of International Application No. PCT/KR2022/009473, filed on Jun. 30, 2022, which claims the benefit of earlier filing date and right of priority to Korean Application No. 10-2021-0086549, filed on Jul. 1, 2021, the contents of which are all hereby incorporated by reference herein in their entireties.

BACKGROUND

1. Field of the Disclosure

The present disclosure relates to a signal processing device and a vehicle communication device including the same, and more particularly to a signal processing device capable of effectively performing intrusion detection on received messages, and a vehicle communication device including the signal processing device.

2. Description of the Related Art

A vehicle is a machine that allows a user to move in a desired direction. A representative example of the vehicle is a car.

Meanwhile, a vehicle communication device is mounted in the vehicle for user convenience.

Particularly, sensing signals of various in-vehicle sensor devices may be transmitted to at least one processor via Controller Area Network (CAN) communication.

Meanwhile, CAN messages are transmitted for the CAN communication, in which in order to detect intrusion in the CAN messages, the processor is required to analyze all the received CAN messages, which places an increasing burden on the processor.

SUMMARY

It is an object of the present disclosure to provide a signal processing device capable of effectively performing intrusion detection on received messages, and a vehicle communication device including the signal processing device.

Meanwhile, it is another object of the present disclosure to provide a signal processing device capable of effectively performing intrusion detection and intrusion prevention on received first messages, and a vehicle communication device including the signal processing device.

In accordance with an aspect of the present disclosure, the above and other objects can be accomplished by providing a signal processing device and a vehicle communication device including the same, which include: a first processor configured to receive a first message including an in-vehicle sensor signal based on a first communication scheme, and to perform signal processing of the received first message; a second processor configured to receive a second message including a communication message received from an external source based on a second communication scheme, and to perform signal processing of the received second message; and a first accelerator configured to accelerate processing of the message received using the first communication scheme, wherein the first processor and the first accelerator perform intrusion detection on the first message in a shared manner.

Meanwhile, the first processor may perform first type intrusion detection; and the first accelerator may perform second type intrusion detection different from the first type intrusion detection.

Meanwhile, in response to detecting intrusion in the first message, the first accelerator may perform intrusion prevention on the first message.

Meanwhile, the first accelerator: may perform intrusion prevention on the first message in response to the first processor detecting intrusion in the first message by performing the first type intrusion detection; and may perform intrusion prevention on the first message in response to detecting intrusion in the first message by performing the second type intrusion detection.

Meanwhile, the first processor may include a first intrusion detector configured to perform the first type intrusion detection; and the first accelerator may include an interface for message exchange with the first processor, and a second intrusion detector configured to perform the second type intrusion detection.

Meanwhile, in response to intrusion detected in a message by the first intrusion detector or the second intrusion detector, the first accelerator may be configured to drop the message.

Meanwhile, the first accelerator may further include: a transmission queue for transmitting a message; and a reception queue for receiving a message, wherein in response to intrusion detected in the message by the second intrusion detector, transmission of the message may be stopped.

Meanwhile, in response to receiving the first message and detecting the first message as a message corresponding to the second type intrusion detection, the first accelerator may drop the message corresponding to the second type intrusion detection; and in response to the first message not being the message corresponding to the second type intrusion detection, the first accelerator may write the message into a shared memory to transmit the message to the first processor.

Meanwhile, the first processor may receive the first message written into the shared memory.

Meanwhile, the first processor may receive the first message via the first accelerator, and in response to the first message detected as a message corresponding to the first type intrusion detection, the first processor may be configured to log the first message and transmit a log of the first message to a server.

Meanwhile, based on a format or timing of the message, the first accelerator may determine whether intrusion is detected in the first message; and based on semantics of the message, the first processor may determine whether intrusion is detected in the first message.

Meanwhile, based on a message ID, data length, and signal range of the first message, or a generation period of the first message, the first accelerator may determine whether intrusion is detected in the first message; and based on semantics of the message, the first processor may determine whether intrusion is detected in the first message.

Meanwhile, based on a message sequence, a range of increase or decrease in signal, a signal state, or a signal correlation in the first message, the first processor may determine whether intrusion is detected in the first message.

Meanwhile, in response to a vehicle speed range in the first message exceeding an allowable value, the first accelerator may detect the first message as the message corresponding to the second type intrusion detection.

Meanwhile, in response to a range of increase or decrease in vehicle speed in the first message exceeding an allowable range of increase or decrease, the first processor may detect the first message as the message corresponding to the first type intrusion detection.

Meanwhile, the signal processing device and the vehicle communication device including the same may further include a second accelerator configured to accelerate processing of the message received using the second communication scheme.

In accordance with another aspect of the present disclosure, the above and other objects can be accomplished by providing a signal processing device and a vehicle communication device including the same, which include: a first processor configured to receive a first message including an in-vehicle sensor signal based on a first communication scheme, and to perform signal processing on the received first message; and a first accelerator configured to accelerate processing of the message received using the first communication scheme, wherein: the first processor performs first type intrusion detection; and the first accelerator performs second type intrusion detection different from the first type intrusion detection.

Effects of the Disclosure

A signal processing device and a vehicle communication device including the same according to an embodiment of the present disclosure include: a first processor configured to receive a first message including an in-vehicle sensor signal based on a first communication scheme, and to perform signal processing of the received first message; a second processor configured to receive a second message including a communication message received from an external source based on a second communication scheme, and to perform signal processing of the received second message; and a first accelerator configured to accelerate processing of the message received using the first communication scheme, wherein the first processor and the first accelerator perform intrusion detection on the first message in a shared manner. Accordingly, it is possible to efficiently perform intrusion detection on the received messages. Particularly, the messages are processed in a shared manner by the first processor and the first accelerator, thereby reducing the load on the first processor.

Meanwhile, the first processor may perform first type intrusion detection; and the first accelerator may perform second type intrusion detection different from the first type intrusion detection. Particularly, the messages are processed in a shared manner according to each type by the first processor and the first accelerator, thereby reducing the load on the first processor.

Meanwhile, in response to detecting intrusion in the first message, the first accelerator may perform intrusion prevention on the first message, thereby efficiently performing intrusion detection and intrusion prevention on the received first message.

Meanwhile, the first accelerator: may perform intrusion prevention on the first message in response to the first processor detecting intrusion in the first message by performing the first type intrusion detection; and may perform intrusion prevention on the first message in response to detecting intrusion in the first message by performing the second type intrusion detection, thereby efficiently performing intrusion detection and intrusion prevention on the received first message.

Meanwhile, the first processor may include a first intrusion detector configured to perform the first type intrusion detection; and the first accelerator may include an interface for message exchange with the first processor, and a second intrusion detector configured to perform the second type intrusion detection, thereby efficiently performing intrusion detection and intrusion prevention on the received first message. Particularly, the messages are processed in a shared manner by the first processor and the first accelerator, thereby reducing the load on the first processor.

Meanwhile, in response to intrusion detected in a message by the first intrusion detector or the second intrusion detector, the first accelerator may be configured to drop the message, thereby rapidly dropping the message in which intrusion is detected.

Meanwhile, the first accelerator may further include: a transmission queue for transmitting a message; and a reception queue for receiving a message, wherein in response to intrusion detected in the message by the second intrusion detector, transmission of the message may be stopped. Accordingly, transmission of the message, in which intrusion is detected, may be stopped rapidly.

Meanwhile, in response to receiving the first message and detecting the first message as a message corresponding to the second type intrusion detection, the first accelerator may drop the message corresponding to the second type intrusion detection; and in response to the first message not being the message corresponding to the second type intrusion detection, the first accelerator may write the message into a shared memory to transmit the message to the first processor, thereby efficiently performing intrusion detection and intrusion prevention on the message.

Meanwhile, the first processor may receive the first message written into the shared memory, thereby efficiently receiving the first message.

Meanwhile, the first processor may receive the first message via the first accelerator, and in response to the first message detected as a message corresponding to the first type intrusion detection, the first processor may be configured to log the first message and transmit a log of the first message to a server, thereby transmitting intrusion detection information about the message to a server.

Meanwhile, based on a format or timing of the message, the first accelerator may determine whether intrusion is detected in the first message; and based on semantics of the message, the first processor may determine whether intrusion is detected in the first message, thereby efficiently performing intrusion detection and intrusion prevention on the message.

Meanwhile, based on a message ID, data length, and signal range of the first message, or a generation period of the first message, the first accelerator may determine whether intrusion is detected in the first message; and based on semantics of the message, the first processor may determine whether intrusion is detected in the first message, thereby efficiently performing intrusion detection on the message.

Meanwhile, based on a message sequence, a range of increase or decrease in signal, a signal state, or a signal correlation in the first message, the first processor may determine whether intrusion is detected in the first message, thereby efficiently performing intrusion detection on the message.

Meanwhile, in response to a vehicle speed range in the first message exceeding an allowable value, the first accelerator may detect the first message as the message corresponding to the second type intrusion detection, thereby efficiently performing intrusion detection on the message about the vehicle speed range.

Meanwhile, in response to a range of increase or decrease in vehicle speed in the first message exceeding an allowable range of increase or decrease, the first processor may detect the first message as the message corresponding to the first type intrusion detection, thereby efficiently performing intrusion detection on the message about the range of increase or decrease in vehicle speed.

Meanwhile, the signal processing device and the vehicle communication device including the same may further include a second accelerator configured to accelerate processing of the message received using the second communication scheme, thereby accelerating processing of the second message.

In accordance with another aspect of the present disclosure, the above and other objects can be accomplished by providing a signal processing device and a vehicle communication device including the same, which include: a first processor configured to receive a first message including an in-vehicle sensor signal based on a first communication scheme, and to perform signal processing on the received first message; and a first accelerator configured to accelerate processing of the message received using the first communication scheme, wherein: the first processor performs first type intrusion detection; and the first accelerator performs second type intrusion detection different from the first type intrusion detection. Accordingly, it is possible to efficiently perform intrusion detection on the received messages. Particularly, the messages are processed in a shared manner by the first processor and the first accelerator, thereby reducing the load on the first processor.

BRIEF DESCRIPTION OF THE DRAWINGS

FIGS. 9 to 15 are diagrams referred to in the description of FIG. 8.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
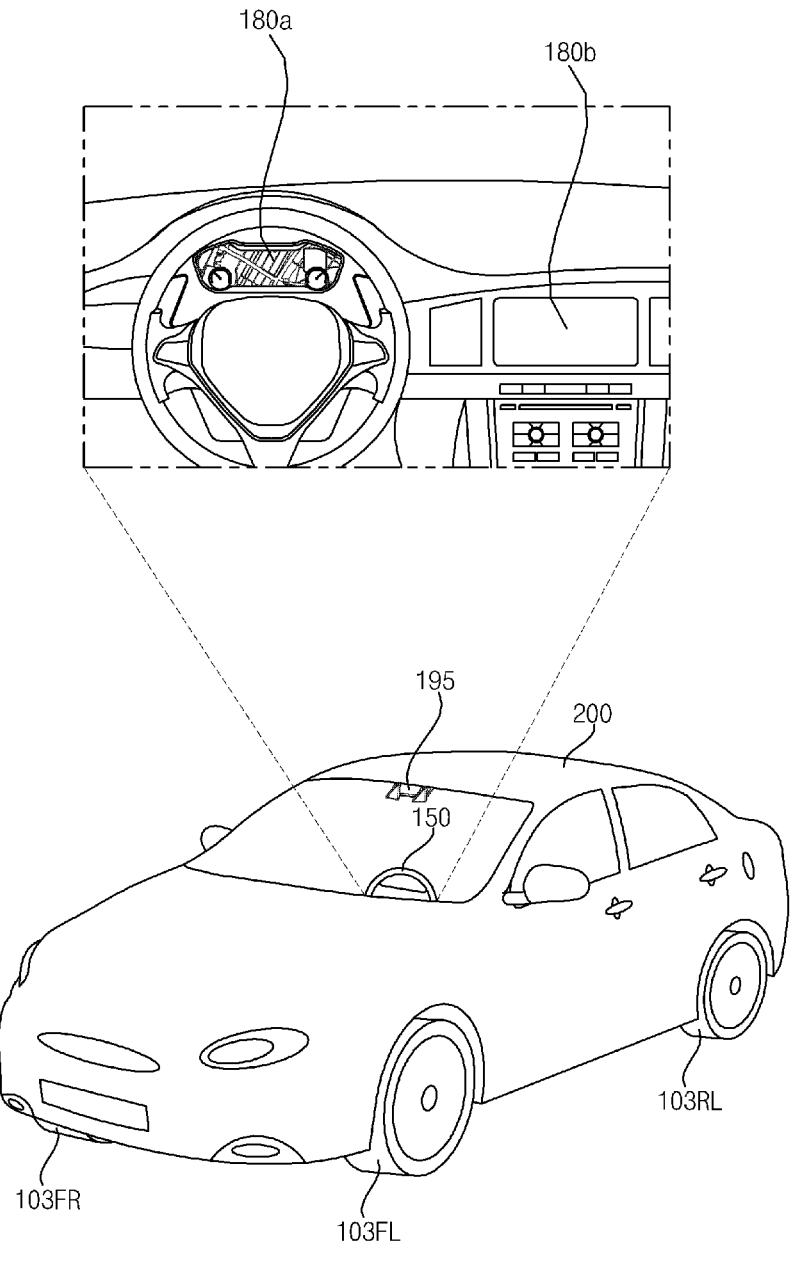
FIG. 1 is a view showing an example of the exterior and interior of a vehicle.

FIG. 1 is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, according to the embodiment of the present disclosure, in a vehicle display apparatus 100 including a plurality of displays 180a and 180b, the plurality of displays 180a and 180b may display the same images in a synchronized state.

In particular, a signal processing device 170 in the vehicle display apparatus 100 may transmit the same data to a plurality of virtual machines in a synchronized state, and may be configured to display the same images on the displays.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 2A:
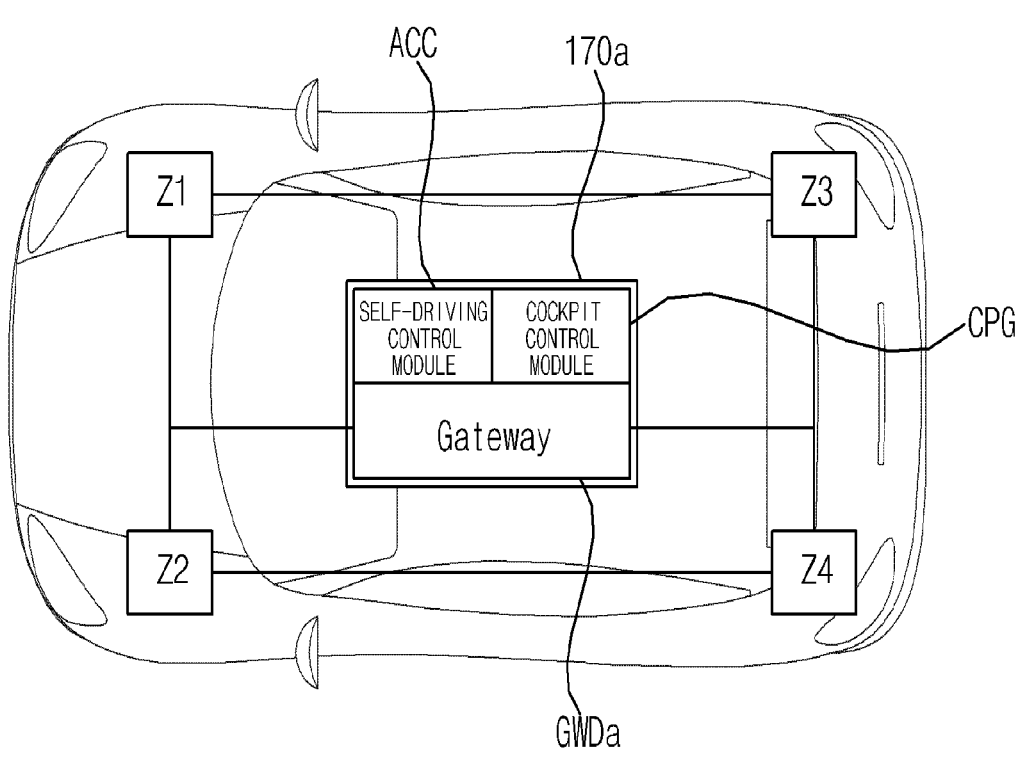
FIGS. 2A to 2C are diagrams illustrating various architectures of a vehicle communication gateway according to an embodiment of the present disclosure.
Figure 2B:
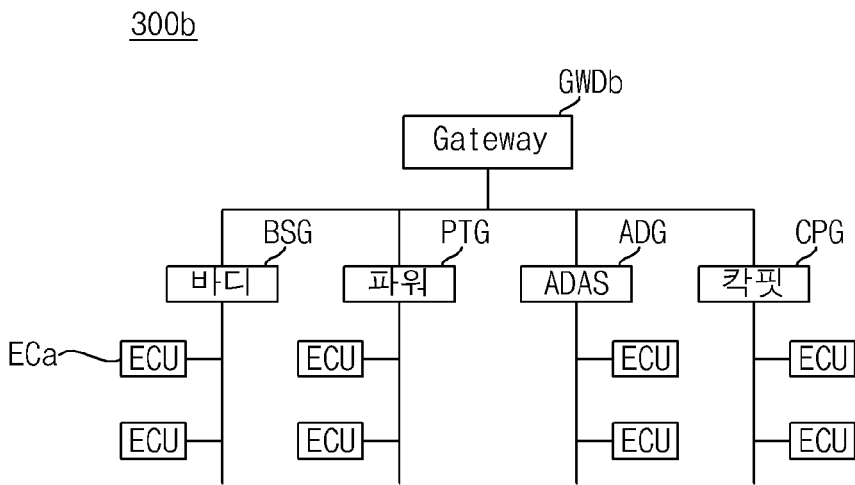
Figure 2C:
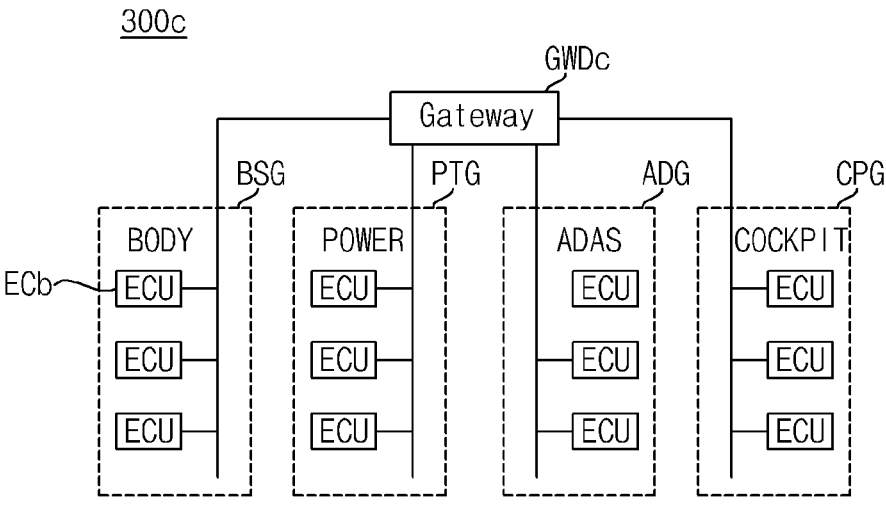

FIGS. 2A to 2C are diagrams illustrating various architectures of a vehicle communication gateway according to an embodiment of the present disclosure.

First, FIG. 2A is a diagram illustrating a first architecture of a vehicle communication gateway according to an embodiment of the present disclosure.

Referring to the drawing, the first architecture 300a may correspond to a zone-based architecture.

Accordingly, in-vehicle sensor devices and processors may be mounted in each of a plurality of zones Z1 to Z4, and a signal processing device 170a including a vehicle communication gateway GWDa may be disposed at the center of the plurality of zones Z1 to Z4.

Meanwhile, the signal processing device 170a may further include a self-driving control module ACC, a cockpit control module CPG, etc., in addition to the vehicle communication gateway GWDa.

The vehicle communication gateway GWDa in the signal processing device 170a may be a High Performance Computing (HPC) gateway.

That is, as an integrated HPC gateway, the signal processing device 170a of FIG. 2A may exchange data with an external communication module (not shown) or processors (not shown) in the plurality of zones Z1 to Z4.

FIG. 2B is a diagram illustrating a second architecture of a vehicle communication gateway according to an embodiment of the present disclosure.

Referring to the drawing, a second architecture 300b may correspond to a domain integrated architecture.

Accordingly, a body chassis control module (BSG), a power control module (PTG), an ADAS control module (ADG), and a cockpit control module (CPG) are connected in parallel to a gateway GWDb, and a plurality of processors ECU may be electrically connected to the respective modules BSG, PTG, ADG, and CPG.

Meanwhile, the respective processors ECU may be connected to the gateway GWDb while being integrated therein.

Meanwhile, the signal processing device 170 including the gateway GWDb of FIG. 2B may function as a domain integrated signal processing device.

FIG. 2C is a diagram illustrating a third architecture of a vehicle communication gateway according to an embodiment of the present disclosure.

Referring to the drawing, a third architecture 300c may correspond to a distributed architecture.

Accordingly, the body chassis control module (BSG), the power control module (PTG), the ADAS control module (ADG), and the cockpit control module (CPG) are connected in parallel to a gateway GWDc, and particularly a plurality of processors ECU in the respective control modules may be electrically connected in parallel to the gateway GWDc.

In comparison with FIG. 2B, the third architecture has a difference in that the respective processors ECU are connected directly to the gateway GWDc without being connected to another module.

Meanwhile, the signal processing device 170 including the gateway GWDc of FIG. 2C functions as a distributed signal processing device.

Figure 3:
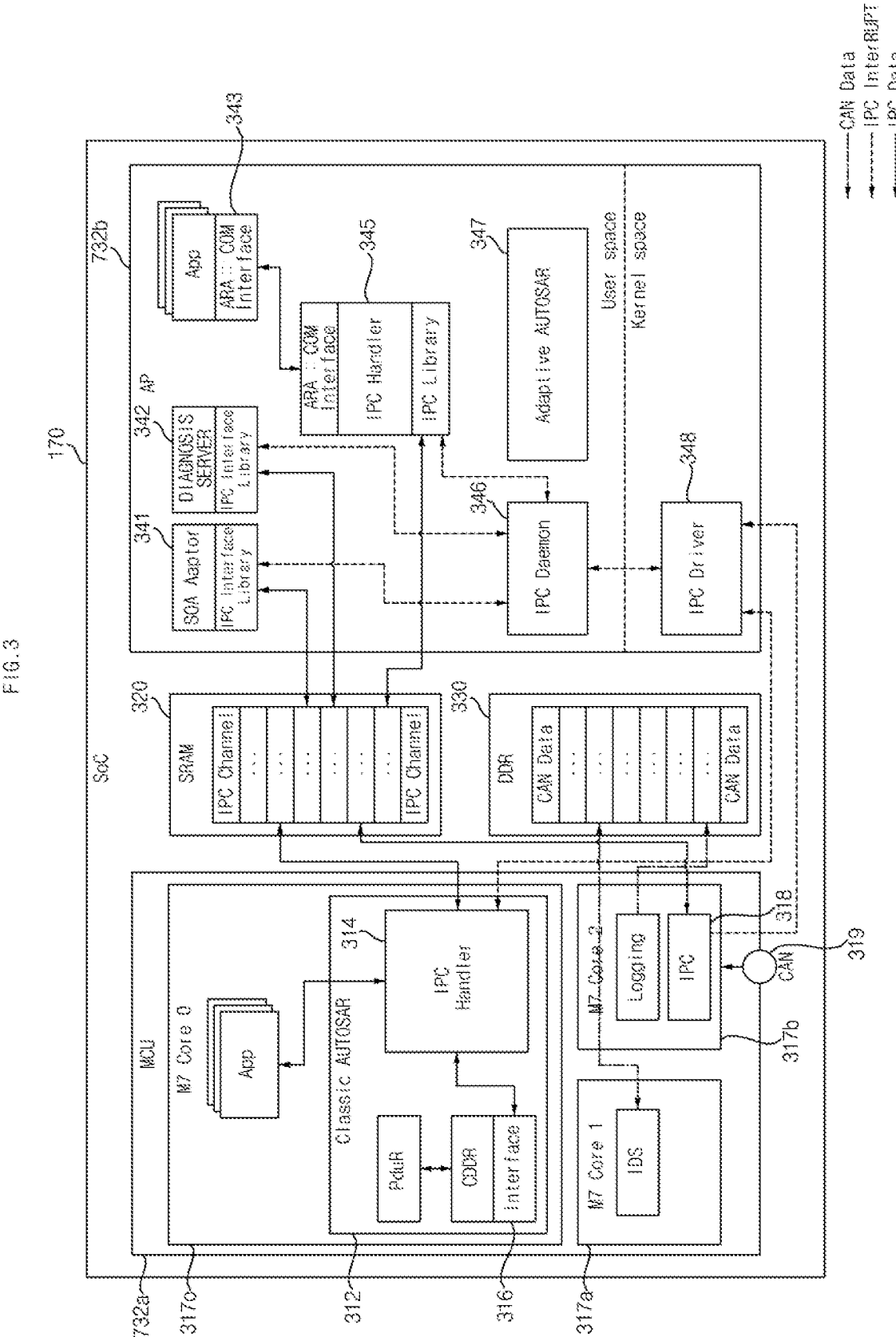
FIG. 3 is an internal block diagram illustrating the signal processing device of FIG. 2A.

FIG. 3 is an internal block diagram illustrating the signal processing device of FIG. 2A.

Referring to the drawing, the signal processing device 170 according to an embodiment of the present disclosure includes: a first processor 732a, which based on a first communication scheme, is configured to receive a first message including a sensor signal in a vehicle and to perform signal processing on the received first message; and a second processor 732b, which based a second communication scheme, is configured to receive a second message including a communication message received from an external source and to perform signal processing on the received second message.

In this case, the second communication scheme may have a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 according to an embodiment of the present disclosure further includes: a first memory 320 having an IPC channel; and a second memory 330 storing sensor data including vehicle speed data.

For example, the first memory 320 may be a Static RAM (SRAM), and the second memory 330 may be a DDR memory. Particularly, the second memory 330 may be a Double data rate synchronous dynamic random access memory (DDR SDRAM).

Meanwhile, the signal processing device 170 according to an embodiment of the present disclosure includes a shared memory 508 which operates for transmitting the first message or the second message between the first processor 732a and the second processor 732b.

As described above, by performing inter-processor communication using the shared memory 508 during the communication between the first processor 732a and the second processor 732b, latency may be reduced and high-speed data transmission may be performed during inter-processor communication.

Meanwhile, it is desired that the shared memory 508 is provided in the first memory 320. Accordingly, latency may be reduced and high-speed data transmission may be performed during inter-processor communication.

Meanwhile, the first processor 732a may include a plurality of processor cores 3170, 317a, and 317b disposed therein.

Meanwhile, the first processor 732a may further include an interface 319 for receiving the CAN message from external vehicle sensors.

For example, a first processor core 3170 included in the first processor 732a may execute a plurality of applications or may execute a first AUTomotive Open System Architecture (AUTOSAR) 312.

Particularly, by executing a second AUTOSAR 312, the first processor core 3170 may execute an inter-processor communication (IPC) handler 314.

Meanwhile, the IPC handler 314 may exchange data with the first memory 320 or may exchange IPC data with an application running on the core 3170.

Meanwhile, the IPC handler 314 may exchange an interrupt signal with an IPC driver 348 included in the second processor 732b.

Meanwhile, a second processor core 317a included in the first processor 732a may execute IDS and may receive CAN data from the second memory 330.

Meanwhile, a third processor core 317b included in the first processor 732a may execute Logging, and may store the CAN data, received through the interface 319, in the second memory 330.

Meanwhile, the third processor core 317b included in the first processor 732a may execute an IPC module 318 to exchange IPC data with the first memory 320.

Meanwhile, the third processor core 317b included in the first processor 732a may transmit an interrupt signal to the IPC driver 348 in the second processor 732b.

The first memory 320 may exchange the IPC data with the IPC handler 314 or the IPC module 318.

Meanwhile, the second processor 732b may execute an application 343, the IPC handler 345, an IPC daemon 346, the IPC driver 348, and the like.

Meanwhile, the second processor 732b may further execute a service oriented architecture (SOA) adapter 341, a diagnosis server 342, and the second AUTOSAR 347.

The second AUTOSAR 347 may be an adaptive AUTOSAR, and the first AUTOSAR 312 may be a classic AUTOSAR.

The IPC daemon 346 may exchange an interrupt signal with the SOA adapter 341, the diagnosis server 342, the IPC handler 345, the IPC driver 348, and the like.

Meanwhile, the first memory 320 may exchange IPC data with the SOA adapter 341, the diagnosis server 342, the IPC handler 345, and the like.

Meanwhile, the IPC data described with reference to FIG. 3 may be the CAN message or Ethernet message.

Meanwhile, the IPC handler 345 may function as a service provider providing data such as diagnosis, firmware, upgrade, system information, etc., based on the second AUTOSAR 347.

Meanwhile, although not illustrated in FIG. 3, the first processor 732a implements a message router (not shown), and the message router may convert a frame of the first message, such as the CAN message, into a frame format of the second message, such as the Ethernet message, and may transmit the converted message to the second processor 732*b*.

Meanwhile, although not illustrated in FIG. 3, the first processor 732*a* may further implement a CAN driver (not shown) and a CAN interface (not shown).

For example, the CAN interface (not shown) may be implemented by a total of 16 channels, with eight channels of each of a fourth processor core (not shown) and a fifth processor core (not shown) in the first processor 732*a*.

In this case, a first CAN interface (not shown) implemented on the fourth processor core (not shown) may correspond to a first queue (PTb) during inter-processor communication, and a second CAN interface (not shown) implemented on the fifth processor core (not shown) may correspond to a second queue (PTb), having a higher priority than the first queue (PTb), during inter-processor communication.

Figure 4A:
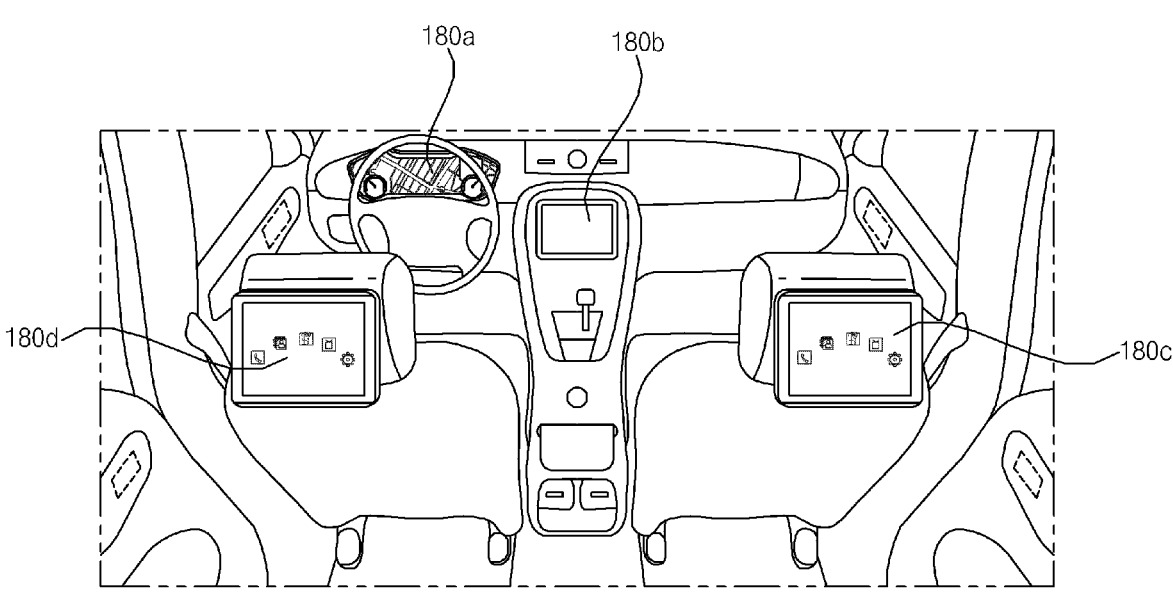
FIG. 4A is a diagram illustrating an example of an arrangement of a vehicle display apparatus in a vehicle according to an embodiment of the present disclosure.

FIG. 4A is a diagram illustrating an example of an arrangement of a vehicle display apparatus in a vehicle according to an embodiment of the present disclosure.

Referring to the figure, a cluster display 180*a*, an audio video navigation (AVN) display 180*b*, rear seat entertainment displays 180*c* and 180*d*, and a rear-view mirror display (not shown) may be mounted in the vehicle.

Figure 4B:
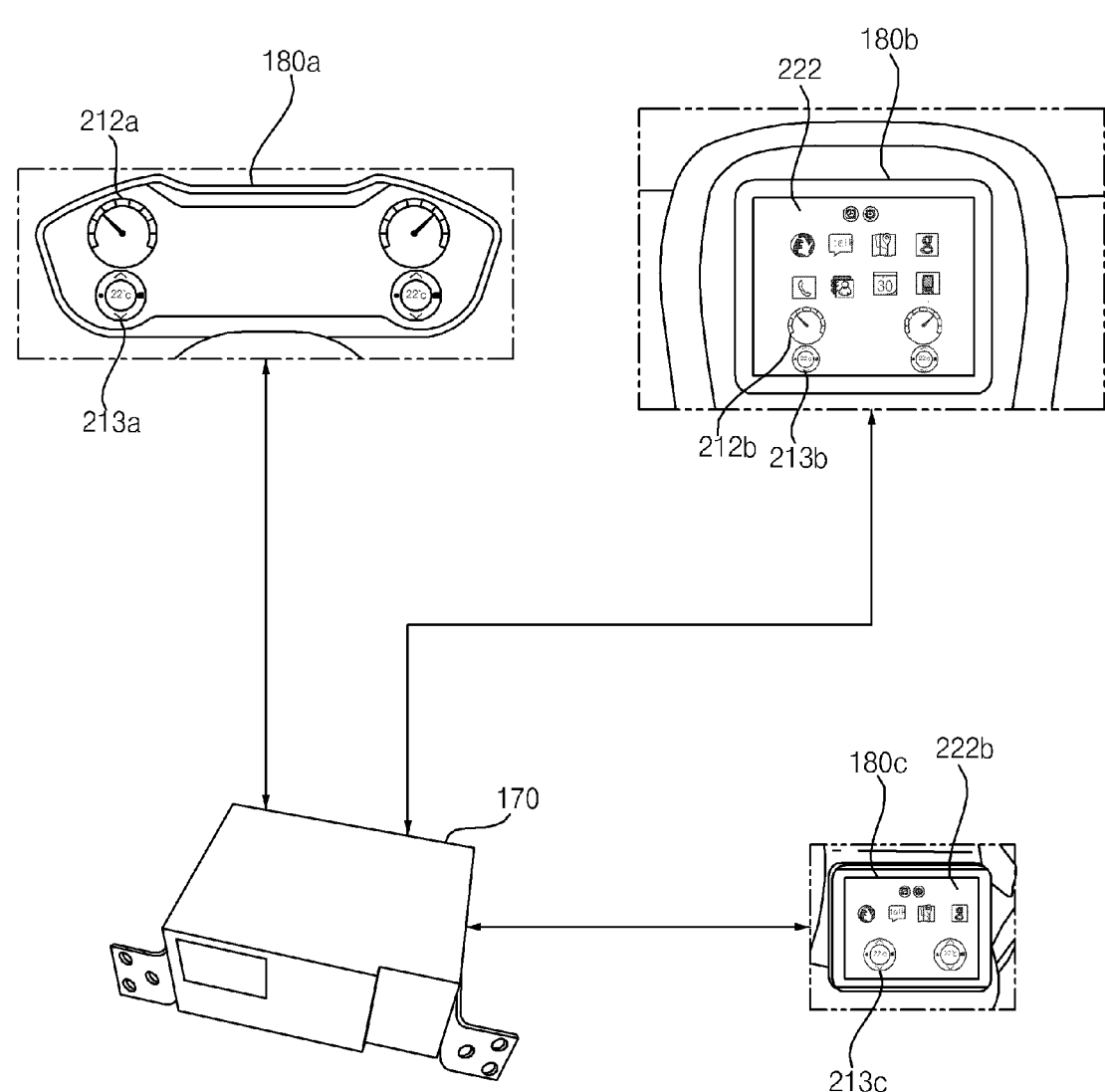
FIG. 4B is a diagram illustrating another example of an arrangement of a vehicle display apparatus in a vehicle according to an embodiment of the present disclosure.

FIG. 4B is a diagram illustrating another example of an arrangement of a vehicle display apparatus in a vehicle according to an embodiment of the present disclosure.

The vehicle display apparatus 100 according to the embodiment of the present disclosure may include a plurality of displays 180*a* and 180*b* and a signal processing device 170 configured to perform signal processing in order to display images and information on the plurality of displays 180*a* and 180*b*.

The first display 180*a*, which is one of the plurality of displays 180*a* and 180*b*, may be a cluster display 180*a* configured to display a driving state and operation information, and the second display 180*b* may be an audio video navigation (AVN) display 180*b* configured to display vehicle driving information, a navigation map, various kinds of entertainment information, or an image.

The signal processing device 170 may have a processor 175 provided therein, and first to third virtual machines (not shown) may be executed by a hypervisor 505 in the processor 175.

The second virtual machine (not shown) may be operated for the first display 180*a*, and the third virtual machine (not shown) may be operated for the second display 180*b*.

Meanwhile, the first virtual machine (not shown) in the processor 175 may be configured to set a shared memory 508 based on the hypervisor 505 for transmission of the same data to the second virtual machine (not shown) and the third virtual machine (not shown). Consequently, the first display 180*a* and the second display 180*b* in the vehicle may display the same information or the same images in a synchronized state.

Meanwhile, the first virtual machine (not shown) in the processor 175 shares at least some of data with the second virtual machine (not shown) and the third virtual machine (not shown) for divided processing of data. Consequently, the plurality of virtual machines for the plurality of displays in the vehicle may divide and process data.

Meanwhile, the first virtual machine (not shown) in the processor 175 may receive and process wheel speed sensor data of the vehicle, and may transmit the processed wheel speed sensor data to at least one of the second virtual machine (not shown) or the third virtual machine (not shown). Consequently, at least one virtual machine may share the wheel speed sensor data of the vehicle.

Meanwhile, the vehicle display apparatus 100 according to the embodiment of the present disclosure may further include a rear seat entertainment (RSE) display 180*c* configured to display driving state information, simple navigation information, various kinds of entertainment information, or an image.

The signal processing device 170 may further execute a fourth virtual machine (not shown), in addition to the first to third virtual machines (not shown), on the hypervisor 505 in the processor 175 to control the RSE display 180*c*.

Consequently, it is possible to control various displays 180*a* to 180*c* using a single signal processing device 170.

Meanwhile, some of the plurality of displays 180*a* to 180*c* may be operated based on a Linux Operating System (OS), and others may be operated based on a Web Operating System (OS).

The signal processing device 170 according to the embodiment of the present disclosure may be configured to display the same information or the same images in a synchronized state on the displays 180*a* to 180*c* to be operated under various operating systems.

Meanwhile, FIG. 4B illustrates that a vehicle speed indicator 212*a* and an in-vehicle temperature indicator 213*a* are displayed on the first display 180*a*, a home screen 222 including a plurality of applications, a vehicle speed indicator 212*b*, and an in-vehicle temperature indicator 213*b* is displayed on the second display 180*b*, and a second home screen 222*b* including a plurality of applications and an in-vehicle temperature indicator 213*c* is displayed on the third display 180*c*.

Figure 5:
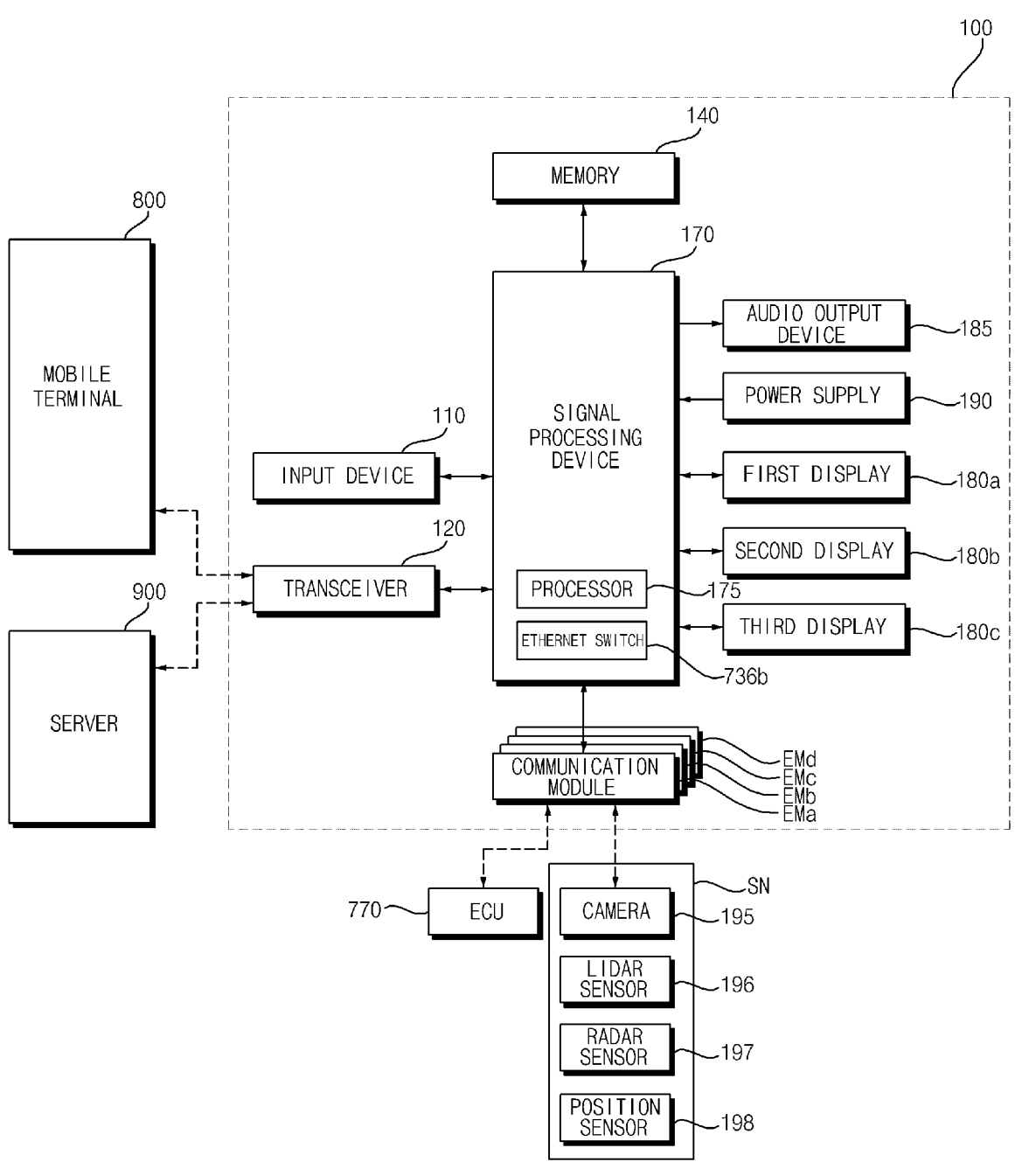
FIG. 5 is an internal block diagram illustrating the vehicle display apparatus of FIG. 4B.

FIG. 5 is an internal block diagram illustrating the vehicle display apparatus of FIG. 4B according to the embodiment of the present disclosure.

Referring to the figure, the vehicle display apparatus 100 according to the embodiment of the present disclosure may include an input device 110, a transceiver 120 for communication with an external device, a plurality of communication modules EMa to EMd for internal communication, a memory 140, a signal processing device 170, a plurality of displays 180*a* to 180*c*, an audio output device 185, and a power supply 190.

The plurality of communication modules EMa to EMd may be disposed in a plurality of zones Z1 to Z4, respectively, in FIG. 2A.

Meanwhile, the signal processing device 170 may be provided therein with an Ethernet switch 736*b* for data communication with the respective communication modules EM1 to EM4.

The respective communication modules EM1 to EM4 may perform data communication with a plurality of sensor devices SN or an ECU 770.

Meanwhile, each of the plurality of sensor devices SN may include a camera 195, a lidar sensor 196, a radar sensor 197, or a position sensor 198.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The plurality of communication modules EM1 to EM4 may receive sensor information from an electronic control unit (ECU) 770 or a sensor device SN, and may transmit the received information to the signal processing device 170.

Here, the sensor information may include at least one of vehicle direction information, vehicle location information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor.

Meanwhile, the position module may include a GPS module configured to receive GPS information or a position sensor 198.

Meanwhile, at least one of the plurality of communication modules EM1 to EM4 may transmit position information data sensed by the GPS module or the position sensor 198 to the signal processing device 170.

Meanwhile, at least one of the plurality of communication modules EM1 to EM4 may receive front-of-vehicle image data, side-of-vehicle image data, rear-of-vehicle image data, and obstacle-around-vehicle distance information from the camera 195, the lidar sensor 196, or the radar sensor 197, and may transmit the received information to the signal processing device 170.

The memory 140 may store various data necessary for overall operation of the vehicle display apparatus 100, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the vehicle display apparatus 100.

For example, the signal processing device 170 may include a processor 175 configured to perform signal processing for the vehicle displays 180a and 180b.

The processor 175 may execute the first to third virtual machines (not shown) on the hypervisor 505 (see FIG. 10) in the processor 175.

Among the first to third virtual machines (not shown) (see FIG. 10), the first virtual machine (not shown) may be called a server virtual machine, and the second and third virtual machines (not shown) and (not shown) may be called guest virtual machines.

For example, the first virtual machine (not shown) in the processor 175 may receive sensor data from the plurality of sensor devices, such as vehicle sensor data, position information data, camera image data, audio data, or touch input data, and may process and output the received sensor data.

As described above, the first virtual machine (not shown) may process most of the data, whereby 1:N data sharing may be achieved.

In another example, the first virtual machine (not shown) may directly receive and process CAN data, Ethernet data, audio data, radio data, USB data, and wireless communication data for the second and third virtual machines (not shown).

Further, the first virtual machine (not shown) may transmit the processed data to the second and third virtual machines 530 and 540.

Accordingly, only the first virtual machine (not shown), among the first to third virtual machines (not shown), may receive sensor data from the plurality of sensor devices, communication data, or external input data, and may perform signal processing, whereby load in signal processing by the other virtual machines may be reduced and 1:N data communication may be achieved, and therefore synchronization at the time of data sharing may be achieved.

Meanwhile, the first virtual machine (not shown) may be configured to write data in the shared memory 508, whereby the second virtual machine (not shown) and the third virtual machine (not shown) share the same data.

For example, the first virtual machine (not shown) may be configured to write vehicle sensor data, the position information data, the camera image data, or the touch input data in the shared memory 508, whereby the second virtual machine (not shown) and the third virtual machine (not shown) share the same data. Consequently, 1:N data sharing may be achieved.

Eventually, the first virtual machine (not shown) may process most of the data, whereby 1:N data sharing may be achieved.

Meanwhile, the first virtual machine (not shown) in the processor 175 may be configured to set the shared memory 508 based on the hypervisor 505 in order to transmit the same data to the second virtual machine (not shown) and the third virtual machine (not shown).

Meanwhile, the signal processing device 170 may process various signals, such as an audio signal, an image signal, and a data signal. To this end, the signal processing device 170 may be implemented in the form of a system on chip (SOC).

Figure 7:
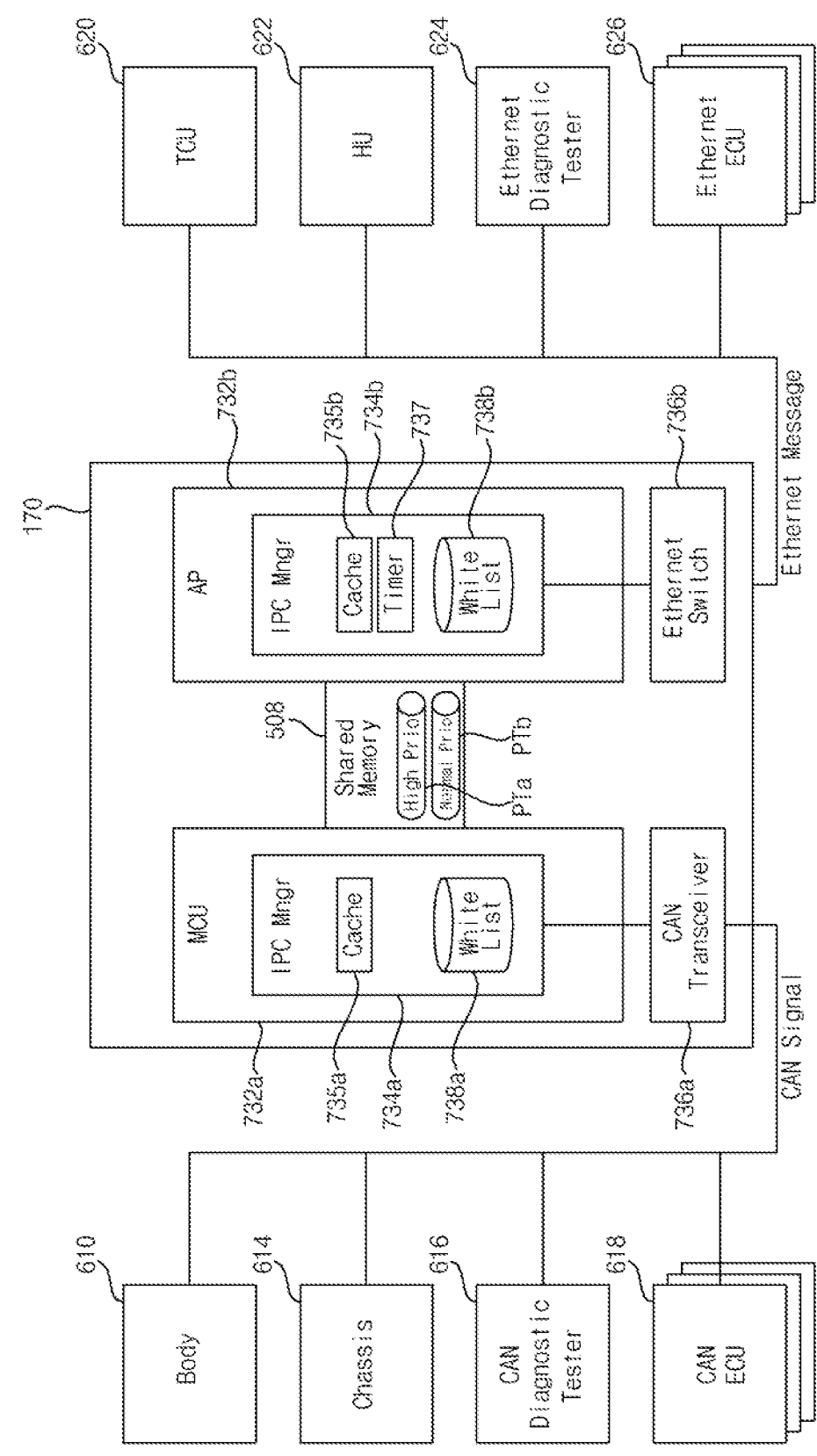
FIG. 7 is another internal block diagram illustrating a vehicle communication device associated with the present disclosure.

Meanwhile, the signal processing device 170 included in the display apparatus 100 of FIG. 5 may be the same as the signal processing device 170 of a vehicle communication device 700 of FIG. 7 and the like.

Figure 6:
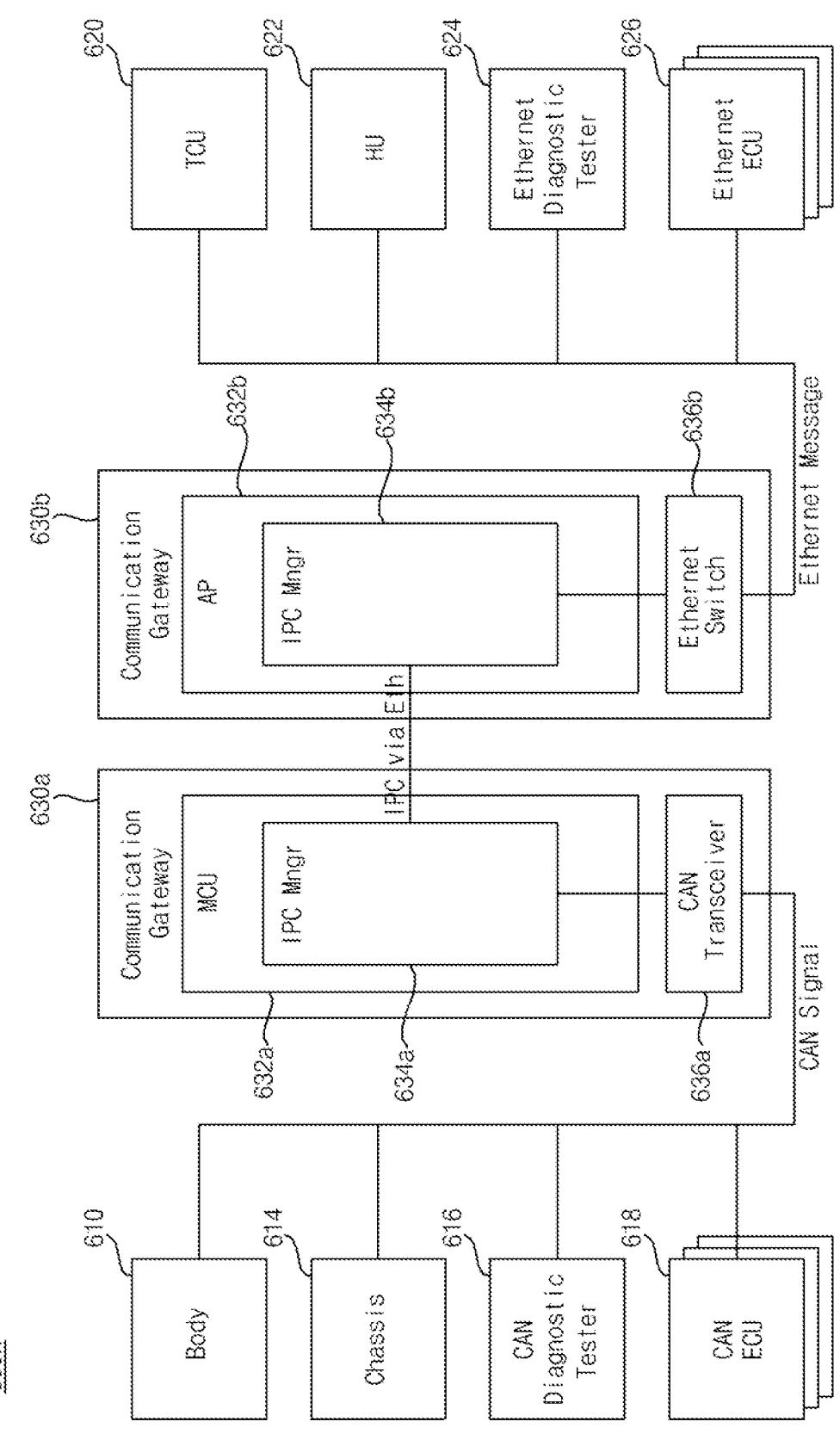
FIG. 6 is an internal block diagram illustrating a vehicle communication device associated with the present disclosure.

FIG. 6 is an internal block diagram illustrating a vehicle communication device associated with the present disclosure.

Referring to the drawing, a vehicle communication device 600x associated with the present disclosure may include a first communication gateway 630a and a second communication gateway 630b.

The first communication gateway 630a may include a body module 610, a chassis module 614, a CAN diagnostic tester 616, a CAN transceiver 636a for exchanging a CAN signal by CAN communication with at least one CAN ECU

618 and the like, and a first processor 632*a* for performing signal processing on the CAN signal received from the CAN transceiver 636*a*.

Meanwhile, the first processor 632*a* may include an IPC manager 634*a* for inter-processor communication with a second processor 632*b* in the second communication gateway 630*b*.

The second communication gateway 630*b* may include a telematics control module 620, a head module 622, an Ethernet diagnostic tester 624, an Ethernet switch 636*b* for exchanging an Ethernet message by Ethernet communication with at least one Ethernet ECU 626, and a second processor 632*b* for performing signal processing on the Ethernet message received from the Ethernet switch 636*b*.

Meanwhile, the second processor 632*b* may include an IPC manager 634*b* for inter-processor communication with the first processor 632*a* in the first communication gateway 630*a*.

Meanwhile, the IPC manager 634*a* in the first processor 632*a* and the IPC manager 643*b* in the second processor 632*b* may perform inter-processor communication based on the Ethernet communication.

While the inter-processor communication is suitable for high-speed transmission of large data using a high bandwidth based on Ethernet, the communication method has a drawback in that latency occurs in communication between a protocol stack and a Physical Layer (PHY).

Accordingly, the present disclosure provides a method of reducing latency and performing high-speed data transmission during inter-processor communication, which will be described below with reference to FIG. 7 and the following figures.

FIG. 7 is another internal block diagram illustrating a vehicle communication device associated with the present disclosure.

Referring to the drawing, the vehicle communication device 700 according to an embodiment may include: a first processor 732*a* which, based on a first communication scheme with a first communication gateway 730*a* and a second communication gateway 730*b*, is configured to receive a first message including an in-vehicle sensor signal and to perform signal processing on the received first message; a second processor 732*b* which, based on a second communication scheme, is configured to receive a second message including a communication message received from an external source and to perform signal processing of the received second message; and a shared memory 508 configured to operate to transmit the first message or the second message between the first processor 732*a* and the second processor 732*b*.

In comparison with the communication device 600*x* of FIG. 6, by using the shared memory 508 for inter-processor communication (IPC) between the first processor 732*a* and the second processor 732*b*, it is possible to reduce latency and to perform high-speed data transmission during the inter-processor communication.

In addition, in comparison with the communication device 600*x* of FIG. 6, by providing the first processor 732*a*, the second processor 732*b*, and the shared memory 508 in one signal processing device 170 implemented as a single chip, it is possible to reduce latency and to perform high-speed data transmission during the inter-processor communication.

Meanwhile, it is preferred that the second communication scheme has a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 and the vehicle communication device 700 including the same according to an embodiment of the present disclosure may further include: a transceiver 736*a* which, based on the first communication scheme, is configured to receive a first message including an in-vehicle sensor signal and to transmit the first message to the first processor 732*a*; and the switch 736*b* which, based on the second communication scheme, is configured to receive a second message including a communication message received from an external source and to transmit the second message to the second processor 732*b*, such that the first and second messages may be transmitted stably to the first processor 732*a* and the second processor 732*b*.

The first processor 732*a* or the transceiver 736*a* may exchange a CAN signal by CAN communication with the body module 610, the chassis module 614, the CAN diagnostic tester 616, at least one CAN ECU 618, and the like.

Meanwhile, the first processor 732*a* may include a first manager 734*a* for inter-processor communication (IPC) with the second processor 732*b*. The first manager 734*a* may be referred to as an IPC manager.

Meanwhile, the first manager 734*a* may include a first cache 735*a*.

Meanwhile, the second processor 732*b* or the switch 736*b* may exchange an Ethernet message by Ethernet communication with the telematics control module 620, the head module 622, the Ethernet diagnostic tester 624, at least one Ethernet ECU 626, and the like. The switch 736*b* may be referred to as an Ethernet switch.

Meanwhile, the second processor 732*b* may include a second manager 734*b* for inter-processor communication (IPC) with the first processor 732*a*. The second manager 734*a* may be referred to as an IPC manager.

Meanwhile, the second manager 734*b* may include the second manager 734*b* including a second cache 735*b* and a timer 737.

Meanwhile, the second processor 723*b* may receive a request for periodic subscription to the first message from the Ethernet processor or the Ethernet ECU 626.

Accordingly, the second processor 732*b* may send the request for periodic subscription to the first message to the first processor 732*a*.

Particularly, the second processor 732*b* may transmit the subscription request through the inter-processor communication (IPC). Accordingly, the inter-processor communication may be performed.

Meanwhile, the first processor 732*a* may periodically receive CAN data from the at least one CAN ECU 618 and the like.

For example, the first processor 732*a* periodically receives the first message, predefined in a CAN database (DB), from the at least one CAN ECU 618 and the like.

For example, the periodic first message, which is sensor information, may include vehicle speed information, position information, or the like.

In another example, the periodic first message may include at least one of vehicle direction information, vehicle location information (GPS information), vehicle angle information, vehicle acceleration information, vehicle tilt information, forward/backward movement information, battery information, fuel information, tire information, vehicle lamp information, in-vehicle temperature information, or in-vehicle humidity information.

Meanwhile, the first processor 732a may select a first message, for which the subscription is requested, among the periodically received CAN data or first messages, and may transmit the first message, for which the subscription is requested, to the second processor 732b.

Meanwhile, the first processor 732a may separately process a first message, for which the subscription is not requested, among the periodically received CAN data or first messages, according to an internal operation without transmitting the message to the second processor 732b.

Specifically, in response to receiving the first message for which the subscription is requested, the first processor 732a may store the first message in the first cache 735a or may manage the first message. In response to receiving the first message, the first processor 732a may compare the first message with a value stored in the first cache 735a, and if a difference therebetween is greater than or equal to a predetermined value, the first processor 732a may transmit the first message to the second processor 732b through the inter-processor communication.

Meanwhile, in response to receiving the first message for which the subscription is requested, the first processor 732a may store the first message in the first cache 735a or may manage the first message. In response to receiving the first message, the first processor 732a may compare the first message with a value stored in the first cache 735a, and if a difference therebetween is greater than or equal to a predetermined value, the first processor 732a may transmit the first message to the second processor 732b through the inter-processor communication using the shared memory 508.

For example, in response to receiving the first message, the first processor 732a may compare the message with a value stored in the first cache 735a, and if the two are not the same, the first processor 732a may transmit the first message to the second processor 732b through the inter-processor communication using the shared memory 508.

In another example, in response to receiving the first message, the first processor 732a may compare the message with the value stored in the first cache 735a, and if the two are the same, the first processor 732a may not transmit the first message to the second processor 732b.

Accordingly, by minimizing cache occupancy or buffer occupancy of the same data, it is possible to reduce latency and to perform high-speed data transmission during inter-processor communication.

Meanwhile, upon first receiving the first message, the second processor 732b may store the first message in the second cache 735b, and upon subsequently receiving the first message, the second processor 732b may update the second cache 735b. Accordingly, it is possible to reduce latency and to perform high-speed data transmission during inter-processor communication.

Meanwhile, in response to receiving the first message, the second processor 732b may generate a thread of the timer 737, and each time the thread terminates, the second processor 732b may send a value in the second cache 735b to the Ethernet processor or the Ethernet ECU 626. Accordingly, it is possible to reduce latency and to perform high-speed data transmission during inter-processor communication.

Meanwhile, during a period in which the inter-processor communication is not performed such that the first message is not received, the second processor 732b may send a value in the second cache 735b to the Ethernet processor or the Ethernet ECU 626.

That is, if a value of the subscribed first message is constant during the period, the cache value stored in the second processor 732b may be sent to the Ethernet processor 626 without the inter-processor communication.

Accordingly, it is possible to minimize the usage of the IPC buffer in the shared memory 508 which operates in FIFO mode. In addition, by maintaining the usage of the IPC buffer to a minimum, data including the first message, the second message, or the like may be transmitted rapidly through the inter-processor communication.

Meanwhile, during a period in which the inter-processor communication is performed such that the first message is received, the second processor 732b may send a value in the updated second cache 735b to the Ethernet processor or the Ethernet ECU 626. Accordingly, it is possible to reduce latency and to perform high-speed data transmission during inter-processor communication.

Meanwhile, during the inter-processor communication, the shared memory 508 may transmit data between the first processor 732a and the second processor 732b through a first queue PTb and a second queue PTa having a higher priority than the first queue PTb.

Particularly, even when the number of events for the inter-processor communication increases, the shared memory 508 may transmit only the data, corresponding to events allocated for the second queue PTa, through the second queue PTa. Accordingly, real-time transmission of a high priority event may be ensured during the inter-processor communication.

For example, the first PTb may be a normal priority queue, and the second queue PTa may be a high priority queue.

Specifically, the shared memory 508 may transmit most of the data through the first queue PTb during the inter-processor communication.

However, the share memory 508 may transmit only time sensitive-critical data without delay through the second queue PTa which is a higher priority queue than the first queue PTb.

For example, the time sensitive-critical data may be speed data, position information data, or the like.

That is, the shared memory 508 may transmit the speed data or position information data between the first processor 732a or the second processor 732b through the second queue PTa. Accordingly, real-time transmission of the speed data or the position information data having a high priority may be ensured during the inter-processor communication.

Meanwhile, the first processor 732a or the second processor 732b may manage a list of applications capable of using the second queue PTa.

For example, the second processor 732b may include an application for displaying speed information, as an application capable of using the second queue PTa, in a second list 738b and may manage the list.

Meanwhile, for real-time transmission through the second queue PTa, a minimum operation is preferred so that there may be no redundant scenarios or applications.

As described above, by transmitting the time sensitive-critical data in real time using the second queue PTa, real-time transmission of a high priority event may be ensured during the inter-processor communication.

Meanwhile, during the inter-processor communication, the shared memory 508 may reduce latency and may perform high-speed data transmission by assigning at least two queues.

In the drawing, an example is illustrated in which the fist manager 734a in the first processor 732a manages a first list 738a which is a whitelist, and the second manager 734b in the second processor 732b manages a second list 738b which is a whitelist, thereby ensuring the real-time transmission of a high-priority event during the inter-processor communication.

Figure 8:
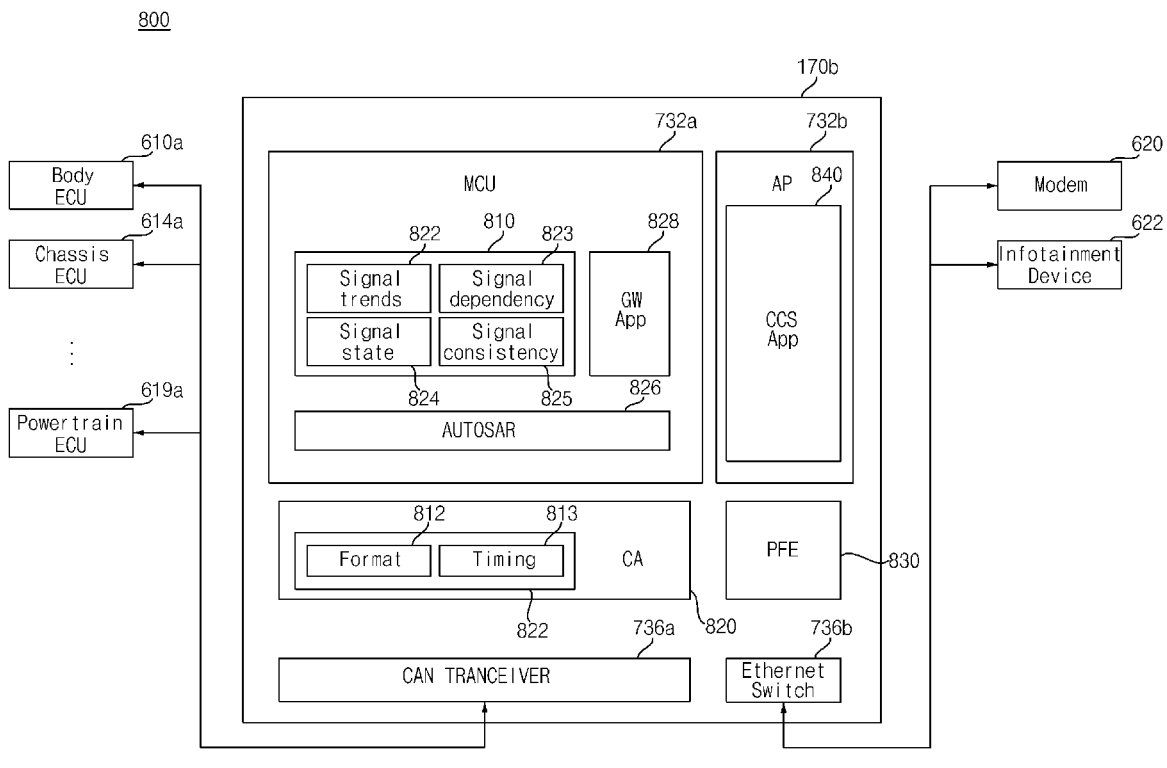
FIG. 8 is an internal block diagram illustrating a vehicle communication device according to an embodiment of the present disclosure.

FIG. 8 is an internal block diagram illustrating a vehicle communication device according to an embodiment of the present disclosure.

Referring to the drawing, a vehicle communication device 800 according to an embodiment of the present disclosure includes a signal processing device 170b configured to process a first message including an in-vehicle sensor signal based on a first communication scheme, and to process a second message based on a second communication scheme.

The signal processing device 170b according to the embodiment of the present disclosure includes: a first processor 732a configured to receive a first message including an in-vehicle sensor signal based on a first communication scheme, and to perform signal processing on the received first message; a second processor 732b configured to receive a second message including a communication message received from an external source based on a second communication scheme, and to perform signal processing on the received second message; and a first accelerator 820 configured to accelerate processing of the message received using the first communication scheme, wherein the first processor 732a and the first accelerator 820 perform intrusion detection on the first message in a shared manner. Accordingly, the first processor 732a and the first accelerator 820 may efficiently perform invasion detection on the received messages. Particularly, the first processor 732a and the first accelerator 820 may process the messages in a shared manner, thereby reducing the load on the first processor 732a.

Meanwhile, the vehicle communication device 800 according to the embodiment of the present disclosure may further include a second accelerator 830 configured to accelerate processing of the message received using the second communication scheme.

Meanwhile, the first message may be a CAN message based on CAN communication, and the first accelerator 820 may be a CAN Accelerator.

Meanwhile, the second message may be an Ethernet message based on Ethernet communication, and the second accelerator 830 may be a Packet Forwarding Engine (PFE).

Here, the in-vehicle sensor signal may include at least one of vehicle wheel velocity data, vehicle direction data, vehicle location data (global positioning system (GPS) data), vehicle angle data, vehicle velocity data, vehicle acceleration data, vehicle tilt data, vehicle forward/backward movement data, battery data, fuel data, tire data, vehicle lamp data, in-vehicle temperature data, in-vehicle humidity data, external vehicle camera data, in-vehicle camera data, external vehicle radar data, or external vehicle lidar data.

As the number of types of in-vehicle sensor signals increases, the number of first messages to be processed by the first processor 732a increases, such that in order to perform invasion detection on the first messages, a greater burden may be placed on the first processor 732a.

Accordingly, in this embodiment, the first processor 732a is in charge of performing intrusion detection on some of the received first messages, and the first accelerator 820 performs intrusion detection on the rest of the received first messages, thereby efficiently performing intrusion detection on the received messages. Particularly, the messages are processed by the first processor 732a and the first accelerator 820 in a shared manner, thereby reducing the load on the first processor 732a.

Meanwhile, the first processor 732a may perform intrusion detection based on a first type (hereinafter referred to as first type intrusion detection), and the first accelerator 820 may perform intrusion detection based on a second type (hereinafter referred to as second type intrusion detection) which is different from the first type. Particularly, the messages are processed in a shared manner according to each type by the first processor 732a and the first accelerator 820, thereby reducing the load on the first processor 732a.

Meanwhile, in response to detecting intrusion in the first messages, the first accelerator 820 may perform intrusion prevention on the first messages, thereby efficiently performing intrusion detection and intrusion prevention on the received first messages.

Meanwhile, when the first processor 732a detects intrusion in the first messages by performing the first type intrusion detection, the first accelerator 820 may perform intrusion prevention on the first messages, and in response to detecting intrusion in the first messages by performing the second type intrusion detection, the first accelerator 820 may perform intrusion prevention on the first messages, thereby efficiently performing intrusion detection and intrusion prevention on the received first messages.

Meanwhile, the first processor 732a includes a first intrusion detector 810 configured to perform the first type intrusion detection. Here, the first type intrusion detection may be intrusion detection based on a non-deterministic method or semantic-based intrusion detection.

Meanwhile, the first intrusion detector 810 may be referred to as a first intrusion detection system (IDS).

Meanwhile, the first intrusion detector 810 in the first processor 732a may perform the first type intrusion detection based on signal trends 822, signal dependency 823, signal state 824, signal consistency 825, and the like in the received message.

The first accelerator 820 includes a second intrusion detector 822 configured to perform the second type intrusion detection. Here, the second type intrusion detection may be intrusion detection based on a deterministic method or syntax-based intrusion detection.

The second intrusion detector 822 may perform the second type intrusion detection based on a format 812 or timing 813 of the received message.

Meanwhile, when the first intrusion detector 810 or the second intrusion detector 820 detects intrusion in a message, the first accelerator 820 may be configured to drop the message. Accordingly, the message, in which intrusion is detected, may be dropped rapidly by the first accelerator 820.

Meanwhile, the signal processing device 170b according to the embodiment of the present disclosure may exchange CAN signals by CAN communication with a body ECU 610a, a chassis ECU 614a, a powertrain ECU 619a, and the like.

To this end, the signal processing device 170b may include a CAN transceiver 636a for CAN communication with the body ECU 610a, the chassis ECU 614a, the powertrain ECU 6119a, and the like.

Meanwhile, the CAN message received by the CAN transceiver 636a, i.e., the first message, may be sent to the first processor 732a through the first accelerator 820.

In this case, the first accelerator 820 receives the first message and determines whether the first message is a message corresponding to the second type intrusion detection.

For example, if the first message is detected as the message corresponding to the second type intrusion detection, the first accelerator 820 may drop the message corresponding to the second type intrusion detection. If the first message is not the message corresponding to the second type intrusion detection, the first accelerator 820 may write the message into the shared memory 508 to transmit the message to the first processor 732a. In this case, the shared memory 508 may be provided in the first memory 320 of FIG. 3.

Meanwhile, if the first message is not detected as the message corresponding to the second type intrusion detection, the first processor 732a receives the first message written into the shared memory 508 and determines whether the first message is a message corresponding to the first type intrusion detection.

For example, if the first message is detected as the message corresponding to the first type intrusion detection, the first processor 732a may be configured to log the first message and transmit a log of the first message to a server.

Meanwhile, in addition to operating or including the first intrusion detector 810, the first processor 732a may implement or include AUTomotive Open System Architecture (AUTOSAR) 826, a gateway application 828, and the like.

Meanwhile, the message sent from the second processor 732b to the first processor 732a may also be sent to the body ECU 610a, the chassis ECU 614a, the powertrain ECU 618a, etc., through the first accelerator 820 and the transceiver 736a.

Meanwhile, the signal processing device 170b according to the embodiment of the present disclosure may exchange Ethernet messages by Ethernet communication with a communication device 620, an infotainment device 622, or the like.

To this end, the signal processing device 170b may include an Ethernet switch 636b for Ethernet communication with the communication device 620, the infotainment device 622, or the like.

Meanwhile, the second message received by the Ethernet switch 636b may be sent to the second processor 732b through the second accelerator 830.

Meanwhile, the second processor 732b may further execute an application in addition to signal processing of the second message.

FIGS. 9 to 15 are diagrams referred to in the description of FIG. 8.

Figure 9:
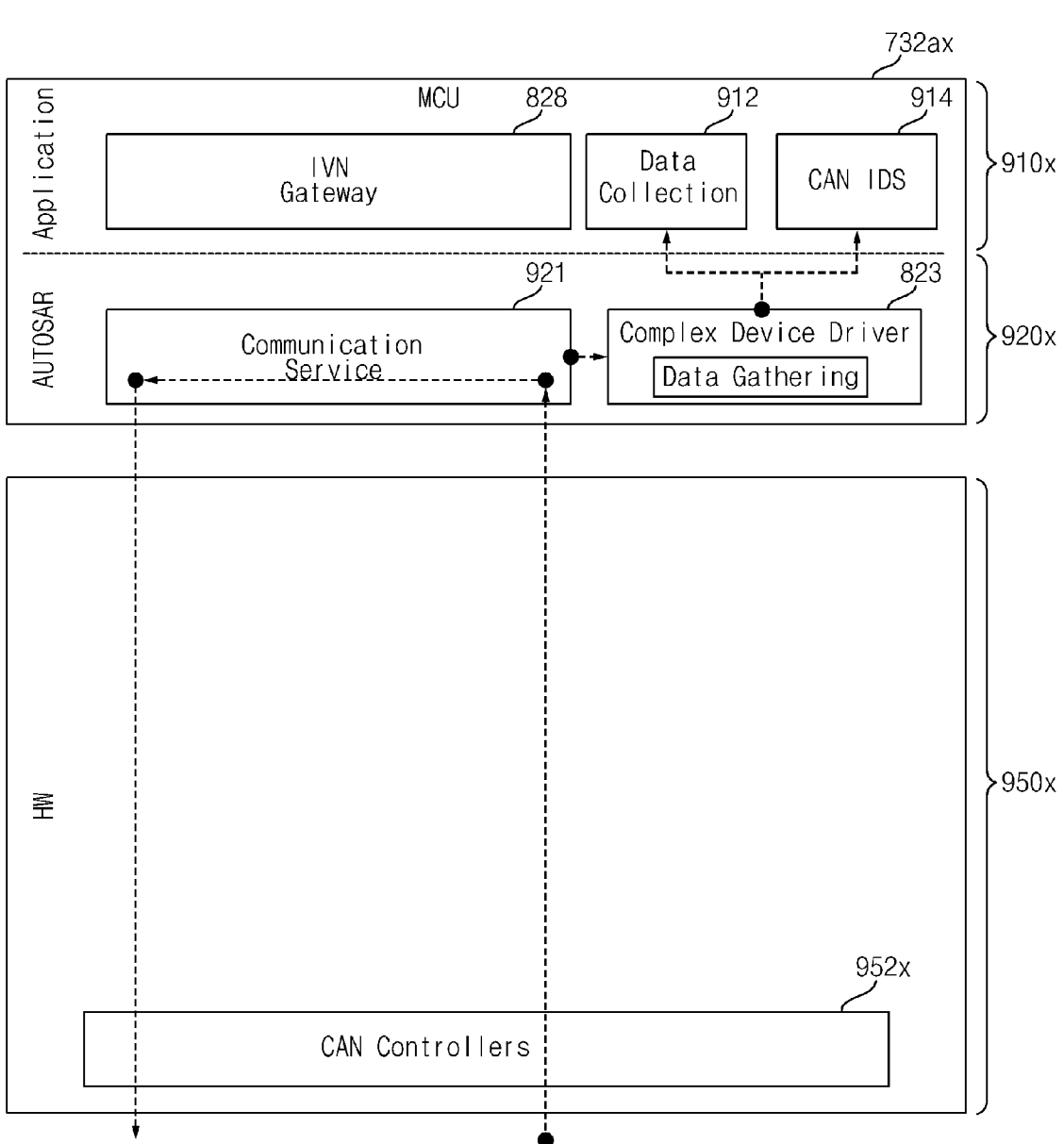

FIG. 9 is a diagram illustrating a signal processing device 170bx associated with the present disclosure.

Referring to the drawing, the signal processing device 170bx associated with the present disclosure may include a first processor 732ax and hardware 950x.

The first processor 732ax may be divided into an area 910x, in which an application is implemented, and an area 920x in which the AUTOSAR is implemented.

If first messages, which are CAN messages, are received via hardware 950x, the first messages are sent from a CAN controller 952x in the hardware 950x to a communication service 921 in the first processor 732ax, and then, for intrusion detection of the first messages, the first messages are sent through a device driver 823, followed by data collection 912, and a CAN intrusion detection system (IDS) 914 performs intrusion detection on the first messages.

Particularly, the CAN IDS 914 performs intrusion detection on all the received first messages.

However, with an increasing trend in the number of sensor signals or the number of types of sensor signals, a problem occurs in that a greater burden may be placed on the first processor 732ax.

In addition, the CAN communication is based on bus topology, such that if the CAN IDS 914 is connected to the same bus, a process of dropping or ignoring the CAN messages becomes so complicated that it is difficult to apply an Intrusion Prevention system (IPS).

Accordingly, as illustrated in FIG. 8, the present disclosure proposes an intrusion detection method in which messages are processed by the first processor 732a and the first accelerator 820 in a shared manner.

Figure 10:
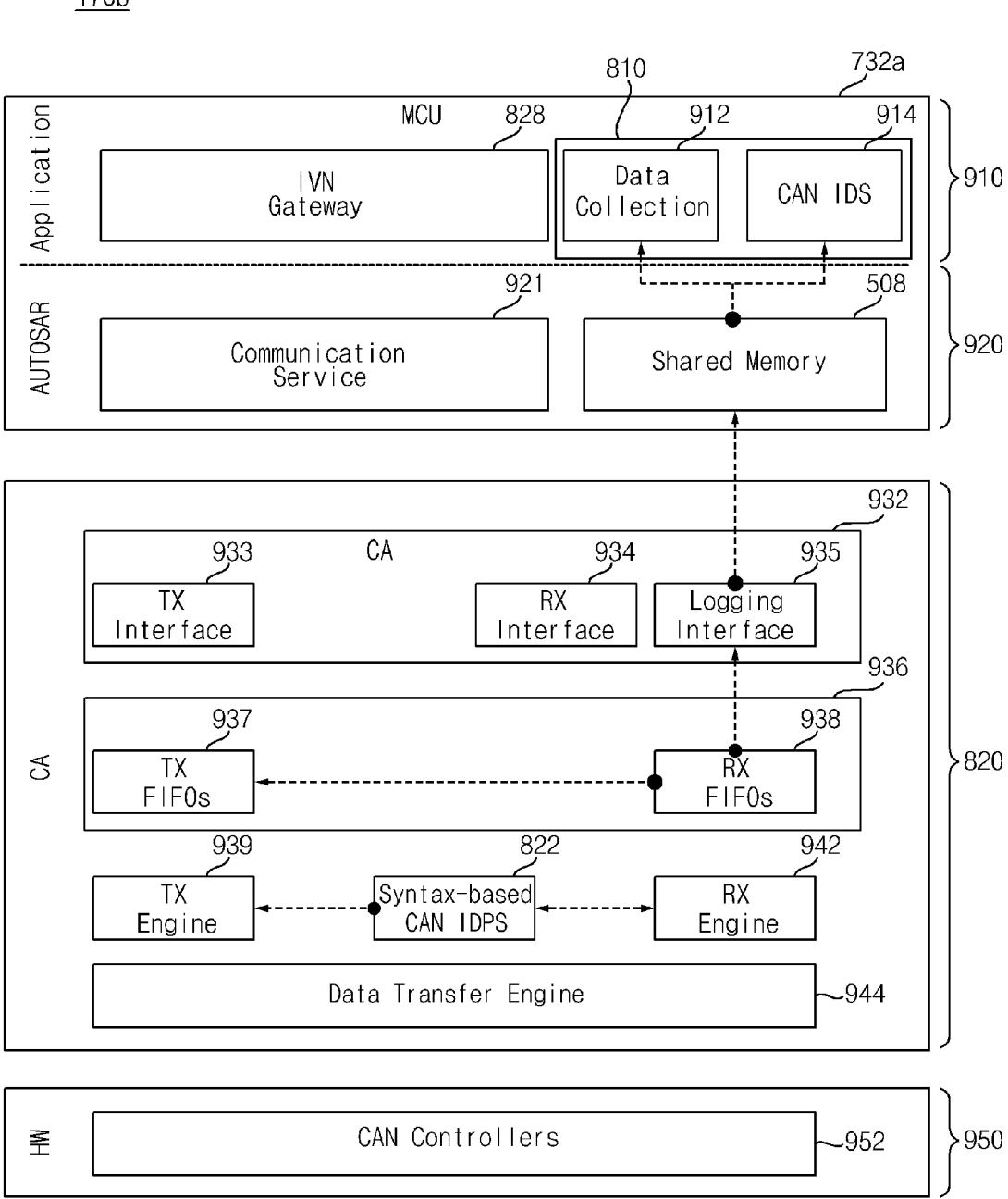

FIG. 10 is a diagram illustrating an example of the signal processing device 170b according to an embodiment of the present disclosure.

Referring to the drawing, the signal processing device 170b according to the embodiment may include the first processor 732a, the first accelerator 820, and hardware 950.

The first processor 732a may be divided into an area 910, in which an application is implemented, and an area 920 in which the AUTOSAR is implemented.

Meanwhile, the first processor 732a may implement the gateway application 828 and the first intrusion detector 810.

In addition, the first processor 732a may implement the communication service 921 and the shared memory 508. Meanwhile, unlike the drawing, the shared memory 508 may be provided in the first memory 320 of FIG. 3.

The first accelerator 820 may include an interface 932 for exchanging messages with the first processor 732a, and the second intrusion detector 822 configured to perform the second type intrusion detection.

The interface 932 may include a transmission interface 933 for transmitting messages to the first processor 732a or an external source, a reception interface 934 for receiving messages from the first processor 732a or the external source, and a logging interface 935 for interfacing with the shared memory.

Meanwhile, the logging interface 935 may operate for mirroring with the shared memory 508.

Meanwhile, the first accelerator 820 may execute or include a queue 936 performing a First-In-First-Out (FIFO) operation for message exchange.

Specifically, the first accelerator 820 may further implement or include a transmission queue 937 for transmitting messages to the first processor 732a or an external source, and a reception queue 938 for receiving messages from the first processor 732a or the external source.

Meanwhile, the first accelerator 820 may further implement a forwarding engine 939 and a reception engine 942 for the transmission queue 937 and the reception queue 938, and a data forwarding engine 944 for data exchange with hardware.

For example, if the first message, which is the CAN message, is received through the hardware 950, the first message is sent from the CAN controller 952 in the hardware 950 to the first accelerator 820, and the second intrusion detector 822 in the first accelerator 820 performs the second type intrusion detection on the first message.

The second intrusion detector 822 transmits a result of the second type intrusion detection to the forwarding engine 939 or the reception engine 942, and the transmission queue 937 or the reception queue 938 operate according to the result.

For example, if the first message is detected as the message corresponding to the second type intrusion detection, transmission of the message may be stopped. Accordingly, it is possible to rapidly stop transmission of the message in which intrusion is detected.

Specifically, in response to receiving the first message and detecting the first message as the message corresponding to the second type intrusion detection, the first accelerator 820 may drop the message corresponding to the second type intrusion detection, and if the first message is not the message corresponding to the second type intrusion detection, the first accelerator 820 may write the message into the shared memory 508 to transmit the message to the first processor 732*a*, thereby efficiently performing intrusion detection and intrusion prevention on the messages.

Meanwhile, if the first message is not the message corresponding to the second type intrusion detection, the first processor 732*a* may receive the first message written into the shared memory 508, thereby efficiently receiving the first message.

Meanwhile, if the first message is not the message corresponding to the second type intrusion detection, the first intrusion detector 810 in the first processor 732*a* receives the first message written into the shared memory 508 and determines whether the first message is a message corresponding to the first type intrusion detection.

For example, if the first message is the message corresponding to the first type intrusion detection, the first intrusion detector 810 in the first processor 732*a* may be configured to log the first message and transmit a log of the first message to the server through the second processor 732*b* and the like, thereby transmitting intrusion detection information about the message to the server.

In another example, if the first message is not the message corresponding to the first type intrusion detection, the first processor 732*a* may perform signal processing on the first message. For example, the first processor 732*a* may send the first message, on which signal processing is performed, or information about the first message to the second processor 732*b* and the like.

Figure 11:
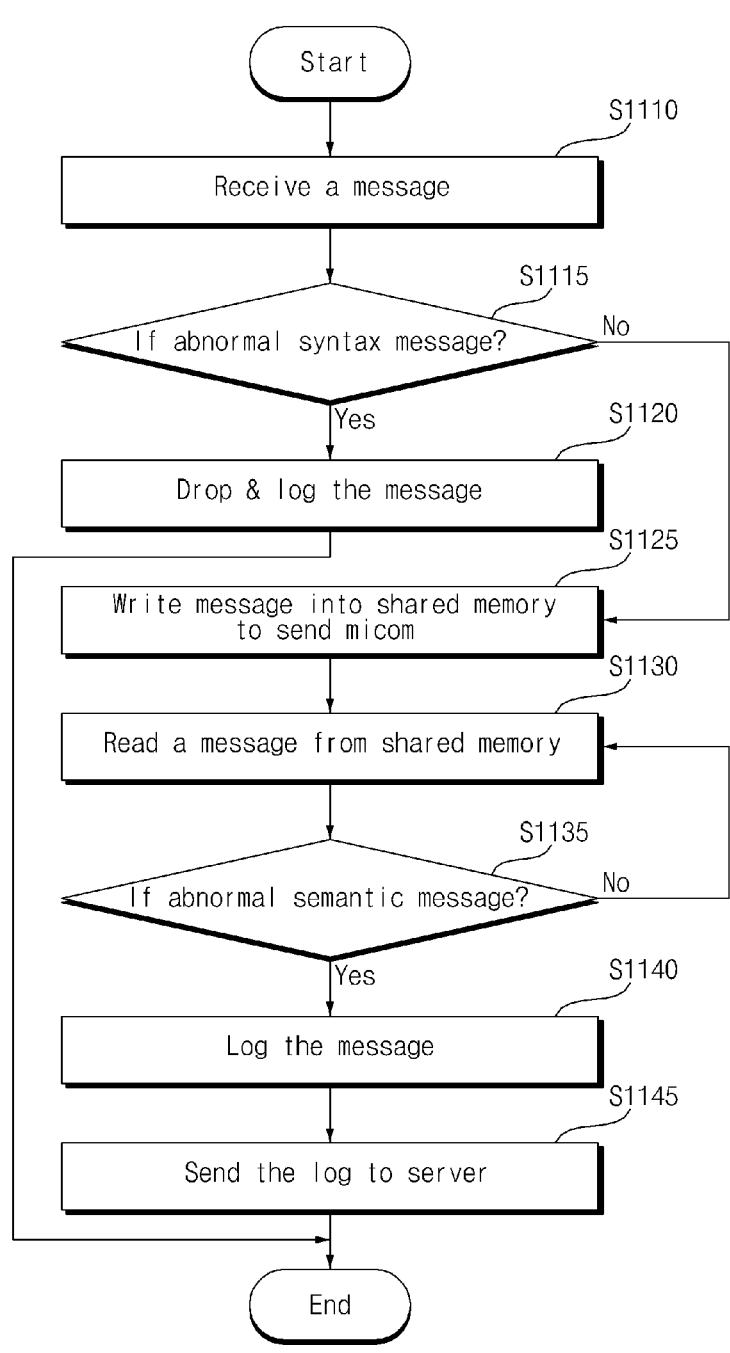

FIG. 11 is a flowchart illustrating a method of operating a signal processing device according to an embodiment of the present disclosure.

Referring to the drawing, the first accelerator 820 in the signal processing device 170*b* receives the first message which is the CAN message (S1110).

Then, the second intrusion detector 822 in the first accelerator 820 detects whether the first message is a message corresponding to the second type intrusion detection (S1115).

For example, if the first message is detected as the message corresponding to the second type intrusion detection, the first accelerator 820 may drop and log the first message (S1120).

In another example, if the first message is not the message corresponding to the second type intrusion detection, the first accelerator 820 may write the message into the shared memory 508 to transmit the message to the first processor 732*a* (S1125).

Meanwhile, the first intrusion detector 810 in the first processor 732*a* receives the first message written into the shared memory 508 (S1130) and determines whether the first message is a message corresponding to the first type intrusion detection (S1135).

For example, if the first message is the message corresponding to the first type intrusion detection, the first intrusion detector 810 in the first processor 732*a* may log the first message (S1140) and may control the second processor 732*b* and the like to transmit a log of the first message to the server (S1145), thereby transmitting intrusion detection information about the message to the server.

An example of detecting whether the first message is a message in which an intrusion is detected (hereinafter referred to as an intrusion detected message) will be described in further detail with reference to FIG. 12A and the following figures.

Figure 12A:
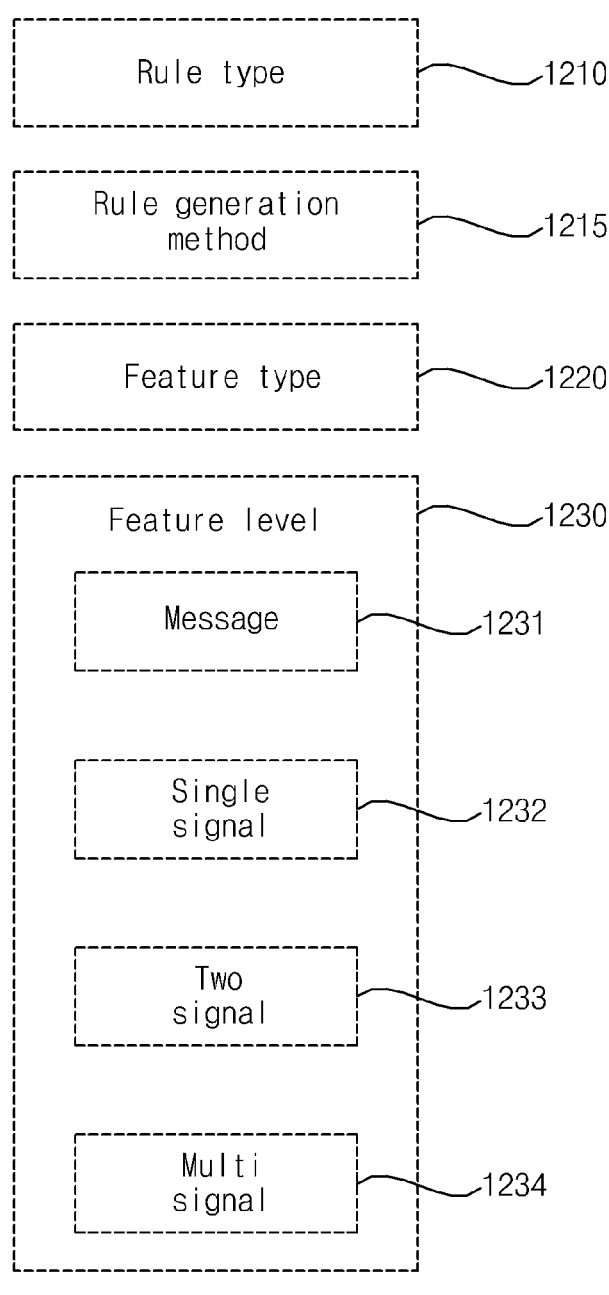

FIG. 12A is a diagram illustrating an example of various detection criteria for intrusion detection.

Referring to the drawing, detecting whether the first message is the intrusion detected message may be classified into Rule type 1210, Rule generation method 1215, feature type 1220, feature level 1230, and the like.

In this case, the feature level 1230 may be classified into message 1231, single signal 1232, two signal 1233, multi signal 1234, and the like.

Figure 12B:
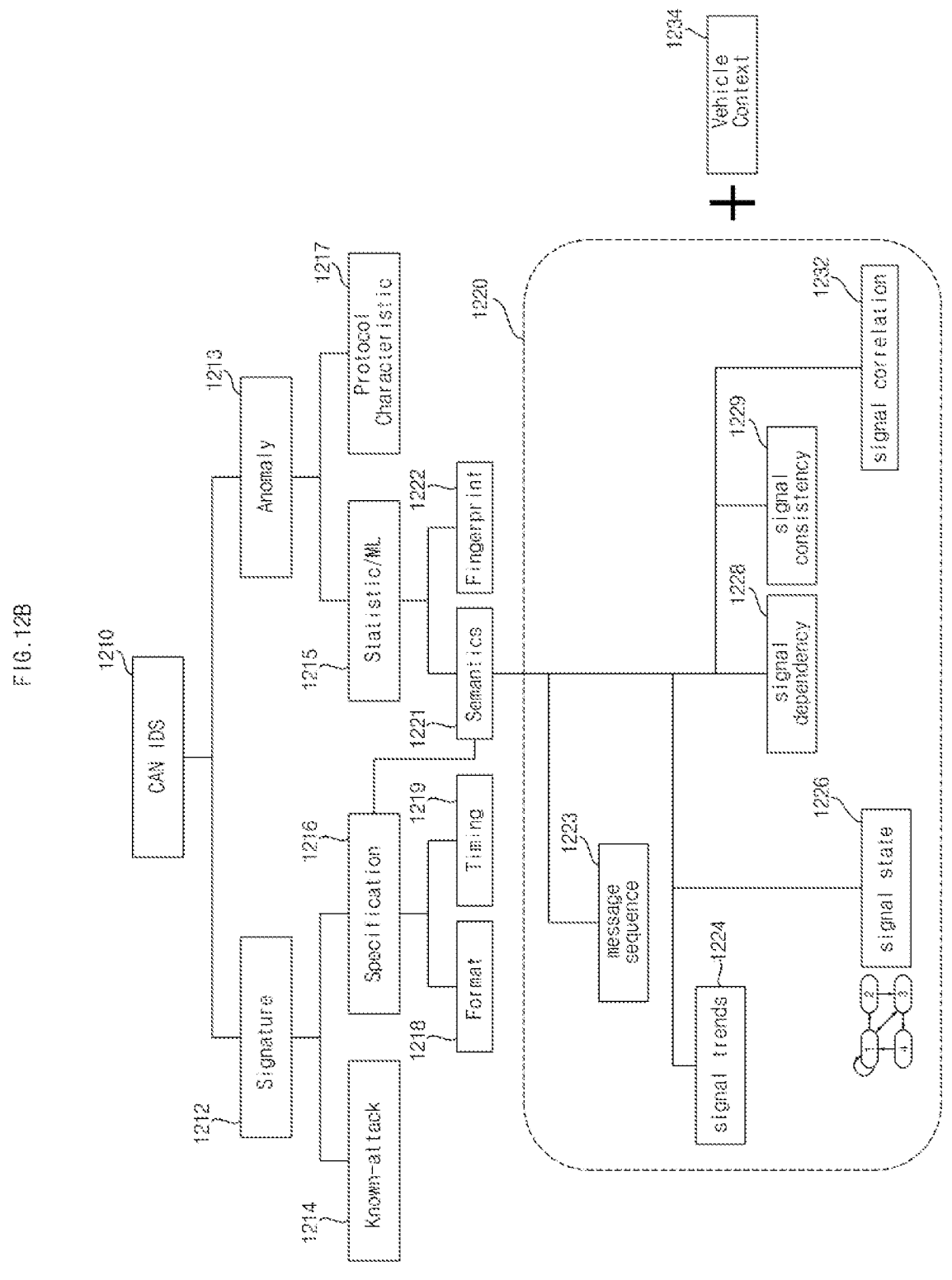

FIG. 12B is a diagram referred to in the description of operation of the first intrusion detector 810 and the second intrusion detector 822.

Referring to the drawing, of known-attack 1214 and specification 1216 under signature 1212, it is determined, based on the specification 1216, whether the first message is a message corresponding to the second type intrusion detection.

Based on format 1218 and timing 1219 under the specification 1216, the second intrusion detector 822 in the first accelerator 820 may detect whether the first message is the message corresponding to the second type intrusion detection.

For example, if a vehicle speed range in the first message exceeds an allowable value, the first accelerator 820 may detect the first message as the message corresponding to the second type intrusion detection, thereby efficiently performing intrusion detection on the message about the vehicle speed range.

Meanwhile, of Statistic/ML 1215 and Protocol Characteristic 1217 under Anomaly 1213, it is determined, based on the Statistic/ML 1215, whether the first message is a message corresponding to the first type intrusion detection, and of Semantics 1221 and Fingerprint 1222 under the Statistic/ML 1215, the determination may be made based on the Semantics 1221.

Meanwhile, the first processor 732*a* may detect whether the first message is the intrusion detected message based on semantics of the message.

The first intrusion detector 810 in the first processor 732*a* may detect whether the first message is the message corresponding to the first type intrusion detection, based on message sequence 1223, signal trends 1224, signal state 1226, signal dependency 1228, signal consistency 1229, signal correlation 1232, and the like.

For example, with respect to the message sequence, if a message is received by a first ECU, a seventh ECU, and a second ECU, the first intrusion detector 810 may detect the message as the message corresponding to first type intrusion detection.

In another example, with respect to the signal trends, if a range of increase or decrease in signal of the first message exceeds an allowable range of increase or decrease, the first intrusion detector 810 may detect the first message as the message corresponding to the first type intrusion detection.

Specifically, if a range of increase or decrease in vehicle speed in the first message exceeds an allowable range of increase or decrease, the first intrusion detector 810 in the first processor 732*a* may detect the first message as the message corresponding to the first type intrusion detection, thereby efficiently performing intrusion detection on the message about the range of increase or decrease in vehicle speed.

In further another example, with respect to the signal dependency, if a correlation of signal changes in the first message exceeds an allowable range, the first intrusion detector 810 may detect the first message as the message corresponding to the first type intrusion detection.

In further another example, with respect to the signal consistency, if the first message suddenly changes from speed data to location information data, the first intrusion detector 810 may detect the first message as the message corresponding to the first type intrusion detection.

In further another example, with respect to the signal correlation, the first intrusion detector 80 may analyze a correlation between multiple signals, and if the correlation exceeds an allowable range, the first intrusion detector 810 may detect the first message as the message corresponding to the first type intrusion detection.

In addition, with respect to vehicle context 1234, if the first message suddenly changes from vehicle driving data to vehicle stop data, the first intrusion detector 810 may detect the first message as the message corresponding to the first type intrusion detection.

FIGS. 13A to 14B are diagrams referred to in the description of operation of the second intrusion detector 822 in the first accelerator 820.

Figure 13A:
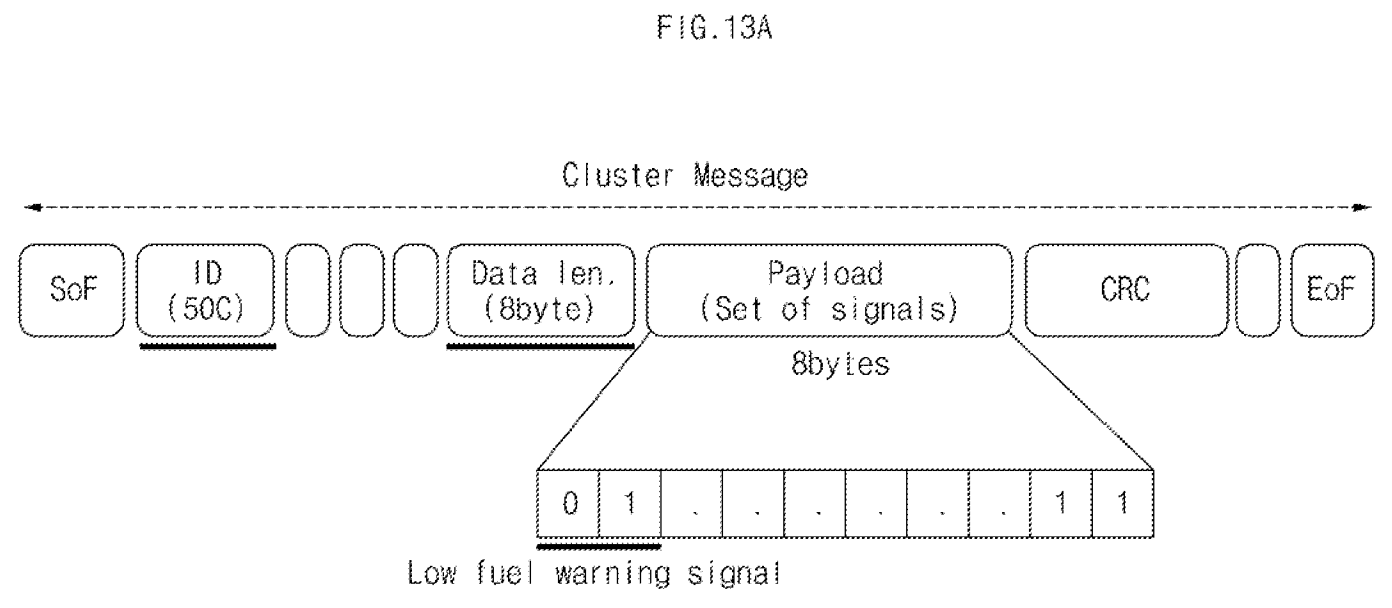

FIG. 13A is a diagram illustrating an example of a cluster message, which is the first message, for format-based detection.

Referring to the drawing, the first accelerator 820 may detect whether the first message is the intrusion detected message based on a message ID, data length, signal range, or message generation period of the first message.

In the drawing, a message ID, 8-byte data length, 8-byte payload, and the like in the cluster message is illustrated.

Meanwhile, a portion of the 8-byte payload may include a low fuel warning signal, as illustrated herein.

FIG. 13B is a diagram illustrating detailed information of the cluster message of FIG. 13A.

Referring to the drawing, the message ID is 50 C, the data length is 8, and the signal range is from 0 to 3.

Meanwhile, if the message ID, data length, or signal range of the first message is changed, the first accelerator 820 may detect the first message as the message corresponding to the first type intrusion detection.

Figure 14A:
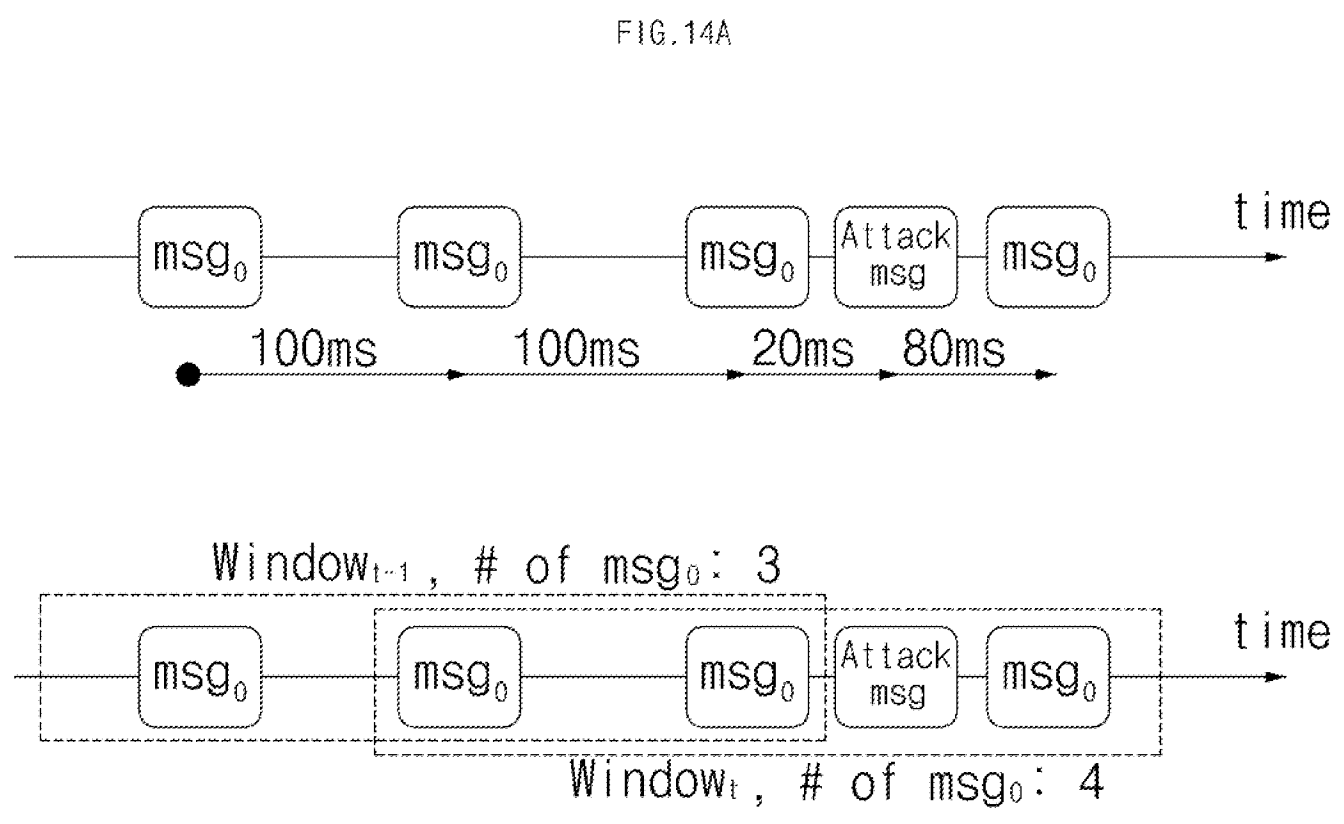

FIG. 14A is a diagram illustrating an example in which a message reception interval of the first message varies for timing-based detection.

Referring to the drawing, while the reception interval of the first message is 100 ms, reception intervals of 20 ms and 80 ms appear in the message due to an attack message.

Accordingly, the first accelerator 820 may detect whether the first message is an intrusion detected message based on the generation period or the reception interval of the first message.

That is, the first accelerator 820 may detect the message, having the reception interval of 20 ms, as the message corresponding to the first type intrusion detection.

Figure 14B:
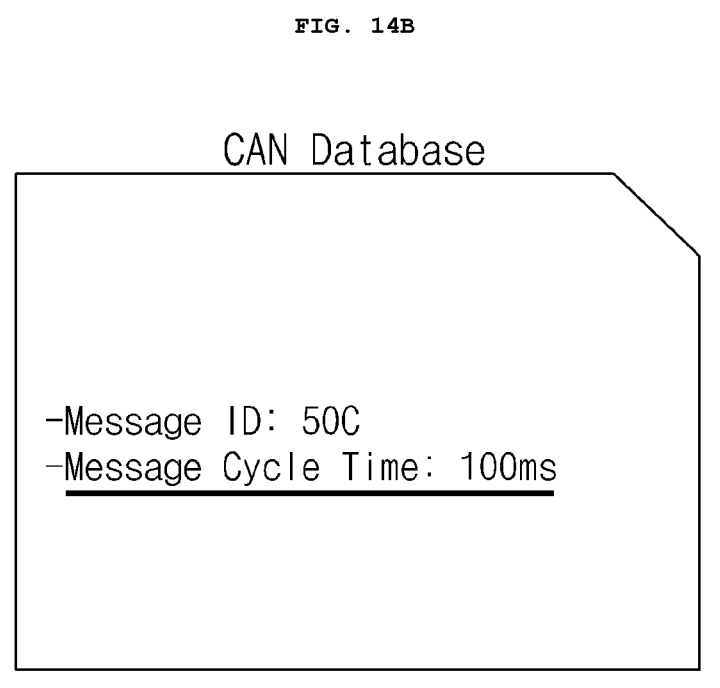

FIG. 14B is a diagram illustrating detailed information of the message of FIG. 14A.

Referring to the drawing, the message ID in the message is 50 C, and the message cycle time is 100 ms.

Meanwhile, if the message cycle time is changed, the first accelerator 820 may detect the message as the message corresponding to the first type intrusion detection.

FIG. 15 is a diagram illustrating various types of attacks.

Referring to the drawing, the first accelerator 820 may detect, based on a format and a timing of a message, whether the message is a message corresponding to the second type intrusion detection, and the first processor 732a may detect, based on semantics of the message, whether the message is a message corresponding to the first type intrusion detection.

With respect to location, the first accelerator 820 may detect whether a message is an intrusion detected message based on the message ID.

For example, if a CAN ID, such as 0x00 which is not allowed and may cause bus load, appears in a message, the first accelerator 820 may detect the message as the intrusion detected message.

With respect to formality, the first accelerator 820 may detect whether a message is the intrusion detected message based on a message length.

For example, if a message length is changed to a value greater than a designated data length code (DLC) value which may cause buffer overflow in the ECU, the first accelerator 820 may detect the message as the intrusion detected message.

With respect to a range, the first accelerator 820 may detect whether a message is the intrusion detected message based on a range in the message.

For example, if vehicle speed information in the first message is 300 km/h with a vehicle speed range exceeding an allowable value, the first accelerator 820 may detect the message as the intrusion detected message.

With respect to a period, the first accelerator 820 may detect whether a message is the intrusion detected message based on a message generation period.

For example, if a period of a received first message is changed, omitted, or delayed, the first accelerator 820 may detect the message as the intrusion detected message.

Meanwhile, with respect to plausibility, the first processor 732a may detect whether a message is the intrusion detected message based on the plausibility of the message.

For example, if the vehicle speed changes from 20 km/h to 200 km/h, the first processor 732a may detect the message as the intrusion detected message based on the plausibility.

Meanwhile, the signal processing device 170b according to another embodiment of the present disclosure may include: a first processor 732a configured to receive a first message including an in-vehicle sensor signal based on a first communication scheme and to perform signal processing on the first message; and a first accelerator 820 configured to accelerate processing of the message received using the first communication scheme, wherein the first processor 732a performs first type intrusion detection, and the first accelerator 820 performs second type intrusion detection different from the first type.

Accordingly, it is possible to efficiently perform intrusion detection on the received messages. Particularly, the messages are processed in a shared manner by the first processor 732a and the first accelerator 820, thereby reducing the load on the first processor 732a.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:
a first processor configured to receive a first message including an in-vehicle sensor signal based on a first communication scheme, and to perform signal processing of the received first message;
a second processor configured to receive a second message including a communication message received from an external source based on a second communication scheme, and to perform signal processing of the received second message; and
a first accelerator configured to accelerate processing of the message received using the first communication scheme,
wherein the first processor and the first accelerator perform intrusion detection on the first message in a shared manner.

2. The signal processing device of claim 1, wherein:
the first processor performs first type intrusion detection; and
the first accelerator performs second type intrusion detection different from the first type intrusion detection.

3. The signal processing device of claim 1, wherein in response to detecting intrusion in the first message, the first accelerator performs intrusion prevention on the first message.

4. The signal processing device of claim 2, wherein the first accelerator is configured to:
perform intrusion prevention on the first message in response to the first processor detecting intrusion in the first message by performing the first type intrusion detection; and
perform intrusion prevention on the first message in response to detecting intrusion in the first message by performing the second type intrusion detection.

5. The signal processing device of claim 2, wherein:
the first processor comprises a first intrusion detector configured to perform the first type intrusion detection; and
the first accelerator comprises an interface for message exchange with the first processor, and a second intrusion detector configured to perform the second type intrusion detection.

6. The signal processing device of claim 5, wherein in response to intrusion detected in a message by the first intrusion detector or the second intrusion detector, the first accelerator is configured to drop the message.

7. The signal processing device of claim 5, wherein the first accelerator further comprises:
a transmission queue for transmitting a message; and
a reception queue for receiving a message,
wherein in response to intrusion detected in the message by the second intrusion detector, transmission of the message is stopped.

8. The signal processing device of claim 2, wherein:
in response to receiving the first message and detecting the first message as a message corresponding to the second type intrusion detection, the first accelerator drops the message corresponding to the second type intrusion detection; and
in response to the first message not being the message corresponding to the second type intrusion detection, the first accelerator writes the message into a shared memory to transmit the message to the first processor.

9. The signal processing device of claim 8, wherein the first processor receives the first message written into the shared memory.

10. The signal processing device of claim 2, wherein in response to the first message via first accelerator detected as a message corresponding to the first type intrusion detection, the first processor is configured to log the first message and transmit a log of the first message to a server.

11. The signal processing device of claim 2, wherein:
based on a format or timing of the message, the first accelerator determines whether intrusion is detected in the first message; and
based on semantics of the message, the first processor determines whether intrusion is detected in the first message.

12. The signal processing device of claim 2, wherein:
based on a message ID, data length, and signal range of the first message, or a generation period of the first message, the first accelerator determines whether intrusion is detected in the first message; and
based on semantics of the message, the first processor determines whether intrusion is detected in the first message.

13. The signal processing device of claim 2, wherein based on a message sequence, a range of increase or decrease in signal, a signal state, or a signal correlation in the first message, the first processor determines whether intrusion is detected in the first message.

14. The signal processing device of claim 2, wherein in response to a vehicle speed range in the first message exceeding an allowable value, the first accelerator detects the first message as the message corresponding to the second type intrusion detection.

15. The signal processing device of claim 2, wherein in response to a range of increase or decrease in vehicle speed in the first message exceeding an allowable range of increase or decrease, the first processor detects the first message as the message corresponding to the first type intrusion detection.

16. The signal processing device of claim 2, further comprising a second accelerator configured to accelerate processing of the message received using the second communication scheme.

17. A signal processing device comprising:
a first processor configured to receive a first message including an in-vehicle sensor signal based on a first communication scheme, and to perform signal processing on the received first message; and
a first accelerator configured to accelerate processing of the message received using the first communication scheme,
wherein:
the first processor performs first type intrusion detection; and
the first accelerator performs second type intrusion detection different from the first type intrusion detection.

18. A vehicle communication device comprising a signal processing device,
wherein the signal processing device comprising:
a first processor configured to receive a first message including an in-vehicle sensor signal based on a first communication scheme, and to perform signal processing of the received first message;
a second processor configured to receive a second message including a communication message received from an external source based on a second communication scheme, and to perform signal processing of the received second message; and a first accelerator configured to accelerate processing of the message received using the first communication scheme, wherein the first processor and the first accelerator perform intrusion detection on the first message in a shared manner.

19. The vehicle communication device of claim 18, wherein:

the first processor performs first type intrusion detection; and the first accelerator performs second type intrusion detection different from the first type intrusion detection.

20. The vehicle communication device of claim 19, wherein the first accelerator is configured to:

perform intrusion prevention on the first message in response to the first processor detecting intrusion in the first message by performing the first type intrusion detection; and perform intrusion prevention on the first message in response to detecting intrusion in the first message by performing the second type intrusion detection.

\* \* \* \* \*